(12) United States Patent
Okano

(10) Patent No.: US 7,148,648 B2
(45) Date of Patent: Dec. 12, 2006

(54) CONTROLLER FOR CONTROLLING ACTUATOR DEVICE INSTALLED ON VEHICLE SO AS TO MAINTAIN SILENCE AND COMFORT IN VEHICLE

(75) Inventor: Takahiro Okano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/069,993

(22) Filed: Mar. 3, 2005

(65) Prior Publication Data

US 2005/0218856 A1    Oct. 6, 2005

(30) Foreign Application Priority Data

Mar. 30, 2004    (JP)    ............... 2004-097389

(51) Int. Cl.
    *G05B 1/06*    (2006.01)
(52) U.S. Cl. .................. 318/638; 318/611; 700/78; 701/111
(58) Field of Classification Search ............. 318/638, 318/611, 560; 700/78; 701/111
    See application file for complete search history.

(56) References Cited

U.S. PATENT DOCUMENTS

| | | | | |
|---|---|---|---|---|
| 5,134,348 A | * | 7/1992 | Izukawa et al. ............ | 318/116 |
| 5,444,346 A | * | 8/1995 | Sudo et al. ................. | 318/616 |
| 5,748,748 A | * | 5/1998 | Fischer et al. ............. | 381/71.4 |
| 5,841,876 A | * | 11/1998 | Gifford et al. ............ | 381/71.14 |
| 6,131,454 A | * | 10/2000 | Kopp et al. ................. | 73/457 |
| 6,621,244 B1 | * | 9/2003 | Kiyomiya et al. .......... | 318/611 |
| 6,783,195 B1 | * | 8/2004 | Grabsch ..................... | 303/191 |
| 6,865,466 B1 | * | 3/2005 | Voight et al. ............... | 701/53 |
| 2002/0126852 A1 | * | 9/2002 | Kashani ..................... | 381/71.4 |
| 2004/0183366 A1 | * | 9/2004 | Kamiya et al. .............. | 303/11 |

FOREIGN PATENT DOCUMENTS

| | | |
|---|---|---|
| JP | U 63-102566 | 7/1988 |
| JP | A 8-127331 | 5/1996 |

* cited by examiner

*Primary Examiner*—Rita Leykin
(74) *Attorney, Agent, or Firm*—Oliff & Berridge, PLC

(57) ABSTRACT

A controller for controlling an actuator device which is installed on a vehicle and operated by a motor. The controller includes: a motor control portion operable to control the motor on the basis of a target value; and a target-value determining portion operable to determine the target value on the basis of a wave intensity characteristic. The wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor. Also disclosed is a wave-intensity-characteristic obtainer for obtaining the wave intensity characteristic by measuring the intensity of the wave.

20 Claims, 15 Drawing Sheets

CONTROLLER FOR CONTROLLING ACTUATOR DEVICE INSTALLED ON VEHICLE SO AS TO MAINTAIN SILENCE AND COMFORT IN VEHICLE

This application is based on Japanese Patent Application No. 2004-097389 filed on Mar. 30, 2004, the content of which is incorporated hereinto by reference.

BACKGROUND OF THE INVENTION

1. Field of the Invention

The present invention relates in general to a controller for controlling a motor operated actuator device, such as a pump device constituting a part of a hydraulically operated braking system, which is installed on a vehicle.

2. Discussion of Related Art

On a vehicle, there are installed various kinds of motor operated actuator devices which are operated by respective motors. Each of the actuator devices, during its activation, generates operating noise and vibration which disturb tranquility or silence in the vehicle. That is, the noise and vibration, when propagated to an occupant of the vehicle, could deteriorate comfort in the vehicle such as feeling in driving the vehicle. In this respect, it is considered to be desirable that generations of the noise and vibration perceivable to the vehicle occupant are restrained.

As an example of technique for reducing the noise and vibration generated by the actuator device, JP-A-H08-127331 (publication of unexamined Japanese Patent Application laid open in 1996) discloses a technique related to control of a pump device of a hydraulically operated braking system. The disclosed technique is directed to control of the pump device on the basis of a running velocity of the vehicle and an operating state of a braking operating member of the braking system, in such a manner that reduces the number of revolutions of a motor of the pump device and the operation time of the pump device, for the purpose of reducing a load applied to the pump device. The reduction in the load applied to the pump device could lead to reduction in generation of the operating noise and vibration. However, the silence and comfort in the vehicle can not be satisfactorily maintained by simply limiting or reducing the output and operation time of the pump motor. This is because a wave such as the noise and vibration is given a proper characteristic with respect to its intensity, which is dependent on factors or phenomena such as resonance occurring in a propagation path between the actuator device (as a wave source) and the occupant of the vehicle.

SUMMARY OF THE INVENTION

It is therefore an object of the present invention to provide a controller capable of controlling a motor operated actuator device installed on a vehicle, in such a manner that improves the silence and comfort in the vehicle. This object may be achieved according to the principle of this invention, which provides a controller characterized by: (a) determining a target value on the basis of at least one wave intensity characteristic each presented by a relationship between (i) a propagated wave intensity (indicative of an intensity of a wave which is generated as a result of activation of the motor operated actuator device and which is propagated to occupant of the vehicle) and (ii) an output index (directly or indirectly indicative of an amount of an output of a motor serves as a drive source to operate the actuator device); and (b) controlling the actuator device operated by the motor, or the motor per se, on the basis of the determined target value.

In the controller constructed according to the principle of this invention, the actuator device or the motor is controlled on the basis of the relationship between the output of the motor and the intensity of the propagated wave (such as acoustic wave and vibrational wave), so that the actuator device can be operated by such an amount of the output of the motor that minimizes operating noise and vibration which are audible and sensible to the occupant of the vehicle. The operating noise and vibration can be thus reduced as much as possible, whereby the silence and comfort in the vehicle can be improved.

VARIOUS MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and a preferred embodiment of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiment of the invention, and that the invention may be embodied with such a possible combination with respect to the same mode.

(1) A controller for controlling an actuator device which is installed on a vehicle and operated by a motor, the controller including: a motor control portion operable to control the motor on the basis of a target value; and a target-value determining portion operable to determine the target value on the basis of at least one wave intensity characteristic, wherein each of the above-described at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor.

The controller constructed according to this mode (1) of the invention is arranged to control the motor on the basis of the relationship between the output of the motor and the intensity of the propagated wave. The intensity of the propagated wave is increased to be peaked due to resonance phenomenon occurring in the propagation path, and is reduced to be bottomed due to antiresonance phenomenon which is a phenomenon opposite to the resonance phenomenon. The thus increased and reduced intensity of the propagated wave is not necessarily in proportion to the output of the motor. Rather, in general, the wave intensity is alternately increased and reduced with increase in the output of the motor. That is, the wave intensity has a peak value or values while the motor output has a particular value or values, and has a bottom value or values while the motor output has another particular value or values. Therefore, the control of the actuator device with use of the relationship between the motor output and the wave intensity makes it possible to, for example, avoid activation of the actuator device in such an output range that provides a high intensity of the propagated wave, and permits activation of the actuator device in such an output range that provides a low intensity of the propagated wave. In other words, the actuator device can be operated by such an amount of the output of the motor that minimizes operating noise and vibration which are audible and sensible to the occupant of the vehicle. The operating noise and vibration can be thus reduced as much as possible, whereby the silence and comfort in the vehicle can be improved.

The "actuator device", which is to be controlled by the controller of the invention, is not particularly limited. The actuator device may be a pump device of a hydraulically operated braking system as described later in detail, or alternatively may be any actuator device installed on a vehicle such as a wiper, an air conditioner, a steering-force assisting device and a variable gear ratio (VGR) steering device used in a power steering system, and an electrically operated drive unit used for driving an electric or hybrid vehicle. The "motor", which serves as a drive source to operate the actuator device, is interpreted to principally mean an electric motor, and may be provided by any kind or type of motor whose output is controllable. The "controller" of the invention may be constructed to include a computer as its main component.

The term "wave" is interpreted to principally mean an acoustic or vibrational wave. The "intensity" of the propagated wave may be represented by sound pressure or amplitude of the propagated wave in a case where the wave means the acoustic wave, and may be represented by amplitude or acceleration of the propagated wave in a case where the wave means the vibrational wave. Further, in either of the two cases, the intensity of the propagated wave may be represented by not only such a common physical quantity but also a particular physical quantity expressing an amount of the operating noise or vibration which is perceivable to the occupant of the vehicle. The "output index" of the motor is interpreted to mean a numerical scale or parameter by which the amount of the output of the motor is expressible, and accordingly may be referred to as "parameter or value relating to the output of the motor". Further, the output index may be an index which is either directly or indirectly indicative of the output of the motor. As examples of the index directly indicative of the motor output, there are a number of revolutions (i.e., rotational velocity) and an output torque of the motor. As examples of the index indirectly indicative of the motor output, there are an electric current, voltage, power and energy supplied or inputted to the motor. It is noted that the term "number of revolutions" used in the present specification should be interpreted to correspond to a rotational speed and specifically mean a number of revolutions per a predetermined length of time such as minute, unless otherwise specified.

The "wave intensity characteristic" is represented by the relationship between the output index and the propagated wave intensity. This relationship may include (i) an equation in which one of the output index and the wave intensity is expressed as a function of a parameter that is provided by the other of the output index and the wave intensity, (ii) a correspondence or pairing of each of particular values (e.g., maximum value, minimum value, peak value, bottom value, maximum-value establishing value, minimum-value establishing value, peak-value establishing value, bottom-value establishing value) in one of the output index and the wave intensity, with a corresponding one of values in the other of the output index and the wave intensity, (iii) a particular value (e.g., maximum value, minimum value, peak value, bottom value) in one of the output index and the wave intensity, and (iv) a corresponding value (e.g., maximum-value establishing value, minimum-value establishing value, peak-value establishing value, bottom-value establishing value) in the other of the output index and the wave intensity, which value corresponds to the particular value. The "target value" is a value relating to the output index, and is interpreted to principally mean a value, on the basis of which the motor is controlled so as to produce a desired amount of the output. Like the output index, the target value may be represented in any one of the number of revolutions, output torque of the motor and the electric current, voltage, power and energy supplied or inputted to the motor. It is noted that the target value and the output index do not have to be necessarily represented in the same item. That is, where the target value is represented in the number of revolutions of the motor, for example, the output index does not have to be necessarily represented in the number of revolutions of the motor. However, since the wave subjected to the control is periodic in its nature, it is preferable that the target value and the output index are both represented in the number of revolutions of the motor which is equivalent to a velocity of a periodic motion of the motor. It is also noted that the above-described peak value and bottom value may be also referred to as a local or relative maximum value and a local or relative minimum value, respectively, and that the above-described maximum value and minimum value should be respectively referred to as an absolute maximum value and an absolute minimum value where the above-described peak value and bottom value are respectively referred to as a relative maximum value and a minimum value.

(2) The controller according to mode (1), wherein the target-value determining portion sets the target value at a value corresponding to a wave-intensity-bottom-value establishing output value in the output index which establishes a bottom value in the propagated wave intensity.

In the controller constructed according to this mode (2) of the invention, the target value is determined based on the "wave-intensity-bottom-value establishing output value" that is one of the above-described particular values in the output index. As described above, there is a case where the wave intensity is given a bottom value or values due to the antiresonance phenomenon, with the motor output having a particular value or values. In such a case, the wave intensity can be reduced by activating the motor with the output being set at the particular value or values. The term "value corresponding to a wave-intensity-bottom-value establishing output value" should be interpreted to mean not only the wave-intensity-bottom-value establishing output value in the output index per se. Where the output index is represented by the number of revolutions of the motor, for example, the target value may be provided by a value in the electric current supplied to the motor which value corresponds to the wave-intensity-bottom-value establishing output value in the number of revolutions of the motor. Further, the target value may be provided by a range within which the wave-intensity-bottom-value establishing output value lies, or may be provided by a value obtained by adding, subtracting, multiplying or dividing a given value to the wave-intensity-bottom-value establishing output value.

(3) The controller according to mode (1), wherein the target-value determining portion selects one of a plurality of wave-intensity-bottom-value establishing output values in the output index which establish respective bottom values in the propagated wave intensity, and wherein the target-value determining portion sets the target value at a value corresponding to the selected one of the plurality of wave-intensity-bottom-value establishing output values in the output index.

The controller constructed according to this mode (3) of the invention serves for a case where the wave intensity has a plurality of bottom values. In the controller of this mode (3), the target-value determining portion may be arranged to compare the plurality of bottom values with each other, and then select one of the plurality of wave-intensity-bottom-value establishing output values which establishes the lowest value in the wave intensity. Alternatively, the target-value determining portion may be arranged to take account of a required performance which is to be exhibited by the actuator device, and then select one of the values which is most suitable for satisfying such a requirement.

(4) The controller according to mode (3), wherein the above-described one of the plurality of wave-intensity-bottom-value establishing output values in the output index is selected on the basis of at least one of (i) a running state of the vehicle, (ii) an operating state of the vehicle, (iii) an activation state of each of at least one device which is installed on the vehicle and is other than the actuator device controlled by the controller, and (iv) an environment surrounding the vehicle.

In the controller constructed according to this mode (4), the selection among the plurality of wave-intensity-bottom-value establishing output values is made by taking account of various factors related to the vehicle. Among the above-described factors, the "running state of the vehicle" can be represented by parameters each of which is indicative of a behavior of the vehicle. Such parameters can be generally categorized into a qualitative parameter and a quantitative parameter. Described specifically, as the qualitative parameter, there are parameters indicative of whether the vehicle is running or not; whether running straight or turning; whether running forward or running backward; whether running on a horizontal road or running on an uphill or downhill road; and whether running on a flat road surface or running on a poor-conditioned road surface. As the quantitative parameter, there are parameters indicative of a rotational velocity of each vehicle wheel; a running velocity of the vehicle; an acceleration of the vehicle as measured in a vehicle running direction; an acceleration of the vehicle as measured in a transversal direction of the vehicle; an acceleration of the vehicle as measured in a longitudinal direction of the vehicle; a relative position of each vehicle wheel and a vehicle body as viewed in a vertical direction; relative velocity and acceleration of each vehicle wheel and the vehicle body as measured in the vertical direction; a steering angle; a degree of inclination of the vehicle body; a yaw rate; a pitching rate; a rolling rate; and a wheel slipping rate.

The "operating state of the vehicle" can be represented by parameters indicative of how the vehicle is being controlled, and those indicative of how or how much the vehicle is being operated by the vehicle driver, in other words, indicative of how or how much the driver is operating the vehicle. Described specifically, as the qualitative parameter representative of the operating state of the vehicle, there are parameters indicative of whether a vehicle engine is being activated or not; whether an ignition switch is placed in its ON state or placed in its OFF state; whether each of a brake pedal and an accelerator pedal is being operated or not; whether or not the vehicle is being subjected to each of an anti-lock brake (ABS) control, a traction control (TRC), a vehicle stability control (VSC) and the like; whether a steering wheel is being operated to be rotated or not; and a currently selected position of a shift member (e.g., shift lever) for a transmission. As the quantitative parameter, there are parameters indicative of an operating amount of an operating amount of the brake pedal; a pressure in a master cylinder; a pressure in each wheel cylinder; an operating amount of the accelerator pedal, an opening angle of a throttle valve; and an operating angle of the steering wheel.

The above-described "at least one device which is installed on the vehicle and is other than the actuator device controlled by the controller" is interpreted to include a device which is likely to exert, during its activation, an influence on the intensity of the wave generated by the actuator device (controlled by the controller), and a device which is activated such that a wave generated by this device is likely to cause the vehicle occupant to become less sensitive to the wave generated by the actuator device (controlled by the controller) when the wave generated by this device is propagated to the occupant. The "activation state" of each of the above-described at least one device can be represented by, for example, parameters indicative of whether the device is being activated or not; and an amount, intensity and frequency of the activation of the device. The "environment surrounding the vehicle" can be represented by, for example, parameters indicative of weather conditions (e.g., whether it is raining or not, temperature, humidity, wind force, wind velocity); road surface conditions (e.g., whether the road surface is smooth, bumpy or frozen); friction coefficient $\mu$ of the road surface; an ambient noise and an altitude at a site at which the vehicle is located.

There is a case where an acoustic wave intensity or a vibrational wave intensity has two bottom values which are established by respective two wave-intensity-bottom-value establishing output values in the output index indicative of the amount of the output of the motor driving the actuator device in the form of a pump device which serves as a hydraulic pressure source of a hydraulically operated braking system, such that a higher one of the two bottom values is established by a higher one of the two wave-intensity-bottom-value establishing output values. In such a case, the controller of this mode (4) may be arranged to control the pump device as the actuator device in a manner variable depending upon whether the pump device is currently required to exhibit a high performance or not. Described specifically, in an usual state in which the propagated noise or vibration should be reduced as much as possible, the target-value determining portion is arranged to select a lower one of the two wave-intensity-bottom-value establishing output values which establishes a lower one of the two bottom values in the acoustic or vibrational wave intensity, and then set the target value at a value corresponding to the lower wave-intensity-bottom-value establishing output value. On the other hand, where the vehicle is running at a high velocity, where the vehicle is running on a downhill road or where the vehicle is running on a road surface having a low friction coefficient $\mu$, namely, in an unusual state in which the pump device is required to exhibit a high performance due to a high probability of execution of an unusual operation such as the above-described ABS control, TRC and VSC, the target-value determining portion is arranged to select the higher wave-intensity-bottom-value establishing output value which establishes the higher bottom value in the acoustic or vibrational wave intensity, and then set the target value at a value corresponding to the higher wave-intensity-bottom-value establishing output value. That is, in the unusual state, an importance is given to the performance of the pump device required for assuring a driving safety, with the silence and comfort being somewhat sacrificed.

The controller of the above-described mode (4) is thus capable of guaranteeing certain degrees of the silence and comfort in the vehicle while satisfying requirements as to the activation amount and performance of the actuator device. It is noted that the target-value determining portion of the controller of the above-described mode (4) may be arranged to select one of the plurality of wave-intensity-bottom-value establishing output values on the basis of a determination which has been made by taking account of various factors under at least one predetermined condition, so that the target value is set at a value corresponding to the selected one wave-intensity-bottom-value establishing output value.

(5) The controller according to mode (1), wherein the above-described at least one wave intensity characteristic includes: (a) an acoustic wave intensity characteristic which is represented by an acoustic-wave-based relationship between a propagated acoustic wave intensity as the propagated wave intensity indicative of the intensity of an acoustic wave as the wave, and the output index; and (b) a vibrational wave intensity characteristic which is represented by a vibrational-wave-based relationship between a propagated vibrational wave intensity as the propagated wave intensity indicative of the intensity of a vibrational wave as the wave, and the output index, and wherein the target-value determining portion determines the target value on the basis of the acoustic wave intensity characteristic and the vibrational wave intensity characteristic.

The acoustic wave and the vibrational wave, each of which is generated as a result of activation of the actuator device, can be handled as the wave by the controller of the invention. However, it is common that their respective wave intensity characteristics (i.e., the acoustic wave intensity characteristic and the vibrational wave intensity characteristic) are different from each other, for example, due to difference therebetween with respect to values or ranges of the output index at or within which the resonance and antiresonance occur. It is therefore preferable that the control of the actuator device is effected by taking account of both of the acoustic wave intensity characteristic and vibrational wave intensity characteristic, for assuring the silence and comfort in the vehicle. In the controller constructed according to this mode (5) of the invention in which the target value is determined on the basis of both of the acoustic wave intensity characteristic and vibrational wave intensity characteristic, it is possible to further improve the degrees of silence and comfort in the vehicle. It is noted that the acoustic wave intensity characteristic and vibrational wave intensity characteristic can be considered to cooperate with each other to constitute a wave intensity characteristic set.

(6) The controller according to mode (5), wherein the target-value determining portion selects one of (a) an acoustic-wave-intensity-bottom-value establishing output value in the output index which establishes a bottom value in the propagated acoustic wave intensity, and (b) a vibrational-wave-intensity-bottom-value establishing output value in the output index which establishes a bottom value in the propagated vibrational wave intensity, and wherein the target-value determining portion sets the target value at a value corresponding to the selected one of the acoustic-wave-intensity-bottom-value establishing output value and the vibrational-wave-intensity-bottom-value establishing output value in the output index.

In the controller constructed according to this mode (6) of the invention, the target value is determined based on both of the acoustic-wave-intensity-bottom-value establishing output value and vibrational-wave-intensity-bottom-value establishing output value. The feature of the controller of this mode (6) is significant particularly in the above-described common case in which the acoustic-wave-intensity-bottom-value establishing output value and vibrational-wave-intensity-bottom-value establishing output value are different from each other. The controller of this mode (6) may be arranged to control the actuator device in a manner changeable depending upon which one of the operating noise and vibration is more uncomfortable or intolerable to the vehicle occupant. Described specifically, when the noise generated by the actuator device is required to become less audible to the vehicle occupant, or when the vehicle occupant is not so sensitive to the vibration generated by the actuator device, the target-value determining portion may be arranged to set the target value at a value corresponding to the acoustic-wave-intensity-bottom-value establishing output value. On the other hand, when the vibration is required to become less sensible to the vehicle occupant, or when the vehicle occupant is not so sensitive to the noise, the target-value determining portion may be arranged to set the target value at a value corresponding to the vibrational-wave-intensity-bottom-value establishing output value. Thus, in the controller of this mode (6), the intensity of the generated wave is controlled to a level suitable to the vehicle occupant, thereby providing the occupant with a high degree of comfort.

(7) The controller according to mode (6), wherein the above-described one of the acoustic-wave-intensity-bottom-value establishing output value and the vibrational-wave-intensity-bottom-value establishing output value in the output index is selected on the basis of at least one of (i) a running state of the vehicle, (ii) an operating state of the vehicle, (iii) an activation state of each of at least one device which is installed on the vehicle and is other than the actuator device controlled by the controller, and (iv) an environment surrounding the vehicle.

In the controller constructed according to this mode (7) of the invention, the above-described one of the acoustic-wave-intensity-bottom-value establishing output value and vibrational-wave-intensity-bottom-value establishing output value is selected by taking account of the various factors related to the vehicle, which are described above. In a case where the actuator device is provided by a pump device of a hydraulically operated braking system, the controller of this mode (7) may be arranged to control the pump device in a manner variable, for example, depending upon which one of the operating noise and vibration is currently more uncomfortable or intolerable to the vehicle occupant. Described specifically, in a usual state in which the operating noise is deemed to be handled by the controller importantly more than the vibration, the target value may be set at a value corresponding to the acoustic-wave-intensity-bottom-value establishing output value. On the other hand, there is a state in which the vehicle occupant is made less sensitive to the operating noise, for example, due to a so-called "road noise" generated during running of the vehicle on a poor-conditioned road, or a "reverse warning buzzer" emitted during placement of the transmission in a rear-drive position. In such a noise-tolerable state in which the vibration is deemed to be handled by the controller importantly more than the noise, the target value may be set at a value corresponding to the vibrational-wave-intensity-bottom-value establishing output value. Further, the target-value determining portion may be arranged to set the target value at the value corresponding to the vibrational-wave-intensitybottom-value establishing output value for the purpose of alleviating the vibration, in a state in which the brake pedal being operated by the vehicle driver while the vibration sensed by the driver through the brake pedal is likely to be large. Meanwhile, the target value may be set at the value corresponding to the acoustic-wave-intensity-bottom-value establishing output value in a state in which the brake pedal is not being operated. Thus, in the controller of this mode (7) in which one of the acoustic-wave-intensity-bottom-value establishing output value and vibrational-wave-intensity-bottom-value establishing output value is selected based on the various factors, it is possible to provide the vehicle occupant with a high degree of comfort while satisfying a required degree of silence in the vehicle.

(8) The controller according to mode (5), wherein the target-value determining portion determines the target value on the basis of the acoustic wave intensity characteristic and the vibrational wave intensity characteristic to each of which a relative weighting is given.

In the controller constructed according to this mode (8), the reduction of the wave perceivable to the occupant is intended by determining the target value through a total evaluation regarding the acoustic wave intensity and vibrational wave intensity, with a degree of importance of each of the acoustic wave intensity characteristic and vibrational wave intensity characteristics being reflected to the total evaluation. Although a specific manner or process of determining the target value is not particularly limited, the determination of the target value can be made, for example, by employing an evaluation function. Described more specifically, the acoustic wave intensity and the vibrational wave intensity are multiplied by respective coefficient which are determined such that the acoustic wave intensity multiplied by a corresponding one of the coefficients and the vibrational wave intensity multiplied by the other of the coefficients can be both expressed in a common unit serving as an index indicative of a degree of discomfort felt by the vehicle occupant. Then, the acoustic wave intensity multiplied by the corresponding coefficient and the vibrational wave intensity multiplied by the other coefficient are respectively given the relative weighting based on the degree of importance. A sum of the thus weighted two values is defined as an evaluation function of a parameter which is provided by the output index, so that the target value can be set to a value corresponding to a value in the output index which value minimizes a value of this evaluation function. Thus, in the controller of this mode (8), the acoustic wave intensity and the vibrational wave intensity can be reduced in such a manner that enables the discomfort felt by the vehicle occupant, to be reduced as much as possible.

(9) The controller according to mode (8), wherein the target-value determining portion includes a relative-weighting determining portion operable to determine the relative weighting which is to be given to each of the acoustic wave intensity characteristic and vibrational wave intensity characteristic.

The relative weighting given to each of the acoustic wave intensity characteristic and vibrational wave intensity characteristic may be constant or invariable. However, as in the controller constructed according to this mode (9), the relative weighting may be determined based on some conditions for each case, so as to be variable from case to case, for making possible to more flexibly deal with both of the operating noise and vibration. The thus increased flexibility in the handling of the operating noise and vibration leads to a further improved comfort in the vehicle.

(10) The controller according to mode (9), wherein the relative-weighting determining portion determines the relative weighting on the basis of at least one of (i) a running state of the vehicle, (ii) an operating state of the vehicle, (iii) an activation state of each of at least one device which is installed on the vehicle and is other than the actuator device controlled by the controller, and (iv) an environment surrounding the vehicle.

In the controller constructed according to this mode (10), the determination of the relative weighting is made by taking account of the various factors related to the vehicle, which are described above. In a case where the actuator device is provided by a pump device of a hydraulically operated braking system, the controller of this mode (10) may be arranged to control the pump device as the actuator device in a manner variable, for example, depending upon to which one of the acoustic wave intensity characteristic and vibrational wave intensity characteristic a larger weight or importance should be given. Described specifically, where the vehicle running velocity is being reduced, or where the vehicle is running on a downhill road, namely, in a state in which the braking operation is thought to be effected at an increased frequency, the weighting given to the vibrational wave intensity characteristic is increased in the determination of the target value, for thereby reducing the vibration sensed by the driver through the brake pedal. Further, in a noise-tolerable state in which the vehicle occupant is made little sensitive to the operating noise, for example, due to road noise generated during running of the vehicle on a poor-conditioned road, the weighting given to the vibrational wave intensity characteristic is increased. On the other hand, in a noise-intolerable sate in which the vehicle is made somewhat sensitive to the operating noise, for example, due to little road noise generated during running of the vehicle on a well-condition road or a flat road surface, the weighting given to the acoustic wave intensity characteristic is increased. In the controller of this mode (10), the acoustic wave intensity and vibrational wave intensity can be totally evaluated based on the above-described various factors, thereby making it possible to deal with the operational noise and vibration in a manner suitable for conditions in which the vehicle is actually situated. It is noted that each of the above-described various factors may be given a relative weighting, too, so that the determination of the relative weighting that is to be given to the each of the acoustic wave intensity characteristic and vibrational wave intensity characteristic, can be made one the basis of the weighted factors.

(11) The controller according to mode (9) or (10), wherein the relative-weighting determining portion effects at least one of (a) a vibrational-wave-based weighting in which the relative weighting given to the vibrational wave intensity characteristic is increased when a sensitivity of the occupant of the vehicle with respect to the acoustic wave is low; and (b) an acoustic-wave-based weighting in which the relative weighting given to the acoustic wave intensity characteristic is increased when a sensitivity of the occupant of the vehicle with respect to the vibrational wave is low. In other words, the relative-weighting determining portion includes at least one of (a') a vibrational-wave-based weighting determining portion operable when a sensitivity of the occupant of the vehicle with respect to the acoustic wave is low, to increase the relative weighting given to the vibrational wave intensity characteristic, and (b') an acoustic-wave-based weighting determining portion operable when a sensitivity of the occupant of the vehicle with respect to the vibrational wave is low, to increase the relative weighting given to the acoustic wave intensity characteristic.

In this mode (11), the relative-weighting determining portion is defined differently or according to a viewpoint different from in the above-described mode (10), although there is described a general form to which rules (applicable in the determination of the relative weighting) are generalized as in the above-described mode (10). In the controller constructed according to this mode (11), the determination of the relative weighting is made by taking account of an overall view, whereby the target value can be determined to be suitable for conditions in which the vehicle is actually situated. Since the propagated wave intensity can be thus effectively reduced, the degree of silence and comfort in the vehicle can be increased to satisfactory degrees.

(12) The controller according to any one of modes (8)–(11), further including a target-value-settable-range determining portion operable to determine a target-value settable range within which the target value is settable by the target-value determining portion.

The reduction in the intensity of the propagated wave such as the operating noise and vibration is effective to satisfy required degrees of silence and comfort in the vehicle. However, for example, there is a case where the acoustic wave intensity characteristic and the vibrational wave intensity characteristic are different from each other with respect to ranges in the output index within which the resonance occurs. In such a case, the target value has to be avoided from being set at a value corresponding to an output value lying in the ranges in which the resonance of the acoustic or vibrational wave occurs. Further, for instance, due to necessity to assure a required degree of performance that is to be exhibited by the actuator device, there is a case where the actuator device requires to be activated such that the output amount of the motor is held within a range in the output index which is limited depending upon situation. For example, where the actuator device is provided by a pump device of a hydraulically operated braking system, the pump device is required to exhibit a high performance during execution of an unusual operation (e.g., the above-described ABS control, TRC, VSC). That is, during the execution of the unusual operation which requires a large amount of the output of the pump motor, it is preferable that the above-described target-value settable range is determined such that a lower limit of the range is made relatively high. In the controller constructed according to the mode (12), it is possible to control the actuator device in a manner practically suitable for any one of cases including a case where the actuator device is required to activated with the output amount of the motor being held within a certain range, since the target-value settable range is determined to be suitable for each case.

(13) The controller according to mode (12), wherein the target-value settable range is determined to be defined between two values respectively corresponding to two output values in the output index which are selected among (a) at least one acoustic-wave-intensity-bottom-value establishing output value in the output index each of which establishes a bottom value in the propagated acoustic wave intensity, and (b) at least one vibrational-wave-intensity-bottom-value establishing output value in the output index each of which establishes a bottom value in the propagated vibrational wave intensity.

In the controller constructed according to this mode (13), the target-value settable range is determined to be defined between the two values respectively corresponding to the two selected wave-intensity-bottom-value establishing output values. In other words, the target-value settable range is determined such that its lower and higher limits are respectively defined by the two selected wave-intensity-bottom-value establishing output values. It is common that a value close to each wave-intensity-bottom-value establishing output value in the output index establishes a relatively low value in the output index. Therefore, in the controller of this mode (13), each of the acoustic wave intensity and vibrational wave intensity can be made small, where the above-described relative weighting is given to each of the acoustic wave intensity characteristic and vibrational wave intensity characteristic.

In the controller of this mode (13), where the above-described at least one acoustic-wave-intensity-bottom-value establishing output value consists of a single output value while the above-described at least one vibrational-wave-intensity-bottom-value establishing output value consists of another single output value, the target-value settable range is determined to be defined between the two single output values. Where the above-described at least one acoustic-wave-intensity-bottom-value establishing output value or/and the above-described at least one vibrational-wave-intensity-bottom-value establishing output value consists of a plurality of output values, the target-value settable range is selected among a plurality of ranges each of which is defined between a corresponding pair of the plurality of output values. In such a case, the target-value settable range is preferably determined to be defined between one of the plurality of output values which establishes a lowest or minimum value in the acoustic or vibrational wave intensity, and one of the plurality of output values which is adjacent to the output value (which may be referred to as "wave-intensity-minimum-value establishing output value") which establishes the minimum value in the acoustic or vibrational wave intensity, for enabling the propagated wave intensity to be further reduced. Further, the target-value settable range may be determined on the basis of the above-described various factors related to the vehicle, for making it possible to reduce the propagated wave in a manner suitable for the actual running condition of the vehicle.

The controller of this mode (13) may be arranged such that the target-value settable range is determined to be defined between two values, one of which is selected among the plurality of acoustic-wave-intensity-bottom-value establishing output values and the other of which is selected among the plurality of vibrational-wave-intensity-bottom-value establishing output values. Further, where the acoustic-wave-intensity-bottom-value establishing output value or values lie between two vibrational-wave-intensity-bottom-value establishing output values as the above-described at least one vibrational-wave-intensity-bottom-value establishing output value, the target-value settable range may be determined to be defined between the two vibrational-wave-intensity-bottom-value establishing output values. Similarly, where the vibrational-wave-intensity-bottom-value establishing output value or values lie between two acoustic-wave-intensity-bottom-value establishing output values as the above-described at least one acoustic-wave-intensity-bottom-value establishing output value, the target-value settable range may be determined to be defined between the two acoustic-wave-intensity-bottom-value establishing output values.

(14) The controller according to any one of modes (1)–(13), further including a wave-intensity-characteristic determining portion operable to determine the above-described at least one wave intensity characteristic, on the basis of which the target-value determining portion determines the target value.

The controller constructed according to this mode (14) of the invention is effective to serve for a case where the wave intensity characteristic, on which is based in the determination of the target value, is variable rather than being fixed, so that the actuator device can be controlled with a high degree of variation. In the controller of this mode (14), the wave intensity characteristic may be provided, for example, by a modified characteristic which is obtained by suitably modifying a standard characteristic, or by a selected characteristic which is selected from among a plurality of alternative characteristics.

(15) The controller according to mode (14), wherein the wave-intensity-characteristic determining portion determines the above-described at least one wave intensity characteristic on the basis of a characteristic changing factor which causes the relationship between the propagated wave intensity and the output index to be changed.

In the controller constructed according to this mode (15), the target value can be determined based on the wave intensity characteristic suitable for the determination, thereby enabling an accurate controlling of the actuator device, even where there exists a factor which causes the wave intensity characteristic per se to be changed. The above-described various vehicle-related factors include at least one factor which corresponds to the "characteristic changing factor" described in this mode (15). For example, in a case where the behavior of the propagation of the wave in the propagation path varies depending upon the ambient temperature or other factor, the propagated wave intensity value which is established by the same value in the output index could be changed depending upon the ambient temperature or other factor. Further, in such a case, the bottom value in the propagated wave intensity and the number of the bottom value might be changed, too. The controller of this mode (15) enables the target value to be determined based on the suitable wave intensity characteristic, even if the ambient temperature or other factor is changed in such a case. It is noted that, where there exist a plurality of characteristic changing factors, the wave intensity characteristic may be determined based on the plurality of characteristic changing factors.

(16) The controller according to mode (15), wherein the wave-intensity-characteristic determining portion selects the above-described at least one wave intensity characteristic from among a plurality of alternative characteristics, on the basis of a level in the characteristic changing factor.

In the controller constructed according to this mode (16), there may be provided a wave-intensity-characteristic storing portion which stores the plurality of alternative characteristics, so that the target-value determining portion determines the target value on the basis of the above-described at least one wave intensity characteristic, which is selected from among the plurality of alternative characteristics stored in the wave-intensity-characteristic storing portion, on the basis of the level in the characteristic changing factor. For example, as described later, the plurality of alternative characteristics can be obtained by actually measuring the intensity of the propagated wave in respective different levels in the characteristic changing factor. From among the thus obtained alternative characteristics, one of those corresponding to the current level in the characteristic changing factor (upon the determination of the target value) is selected as the wave intensity characteristic, thereby making it possible to effect the reduction in the propagated wave intensity in a manner suitable for the actual situation. It is noted that, where there exist a plurality of characteristic changing factors, the wave intensity characteristic may be determined based on the plurality of characteristic changing factors, as in the above-described mode (15). That is, the wave-intensity-characteristic storing portion may be arranged to store the plurality of alternative characteristics each of which corresponds to a corresponding one of various levels in a corresponding one of various characteristic changing factors, so that the target value is determined based on a currently suitable one of those stored in the wave-intensity-characteristic storing portion.

(17) The controller according to any one of modes (1)–(16), further including an activation-condition changing portion operable to change an activation condition, with satisfaction of which the actuator device is activated, wherein the activation-condition changing portion changes the activation condition such that length of time for which the actuator device is activated is reduced.

In the controller constructed according to this mode (17), the actuator device can be controlled for assuring the silence and comfort in the vehicle, also in a manner different from the controller of each of the above-described modes. Described specifically, in the controller of this mode (17), it is possible to selectively carry out a control (hereinafter referred to as "first control") in which the actuator device is controlled based on the wave intensity characteristic, and a control (hereinafter referred to as "second control") in which the length of time of the activation of the actuator device is reduced for restraining the generation of the operating noise and vibration. That is, the actuator device can be controlled with a higher degree of variation. For example, the controller of this mode (17) may be arranged to normally carry out the first control based on both of the acoustic wave intensity characteristic and vibrational wave intensity characteristic, and to carry out the second control as described in this mode (17) in place of the first control, under such a condition that disables the first control to improve the silence to an extent possible to satisfy the vehicle occupant.

The controller of this mode (17) can be used for controlling the actuator device in the form of a pump device of a hydraulically operated braking system in which the pump device is activated while a hydraulic pressure in the braking system is not higher than a threshold. In this case, the controller may be arranged to reduce the length of time of the activation of the pump device while an engine of the vehicle is not being rotated, namely, while the vehicle occupant is likely to be sensitive to the wave generated by the pump device, due to absence of running noise and vibration which could be generated if the vehicle is running. The length of time of the pump activation can be reduced, for example, by lowering the above-described threshold, so that the vehicle occupant can enjoy the silence for a larger length of time. Where the pump device is activated in an intermittent manner, the lowered threshold leads to a reduced number of times of the pump activation and/or a reduced length of time of the pump activation in each time of the activation. It is noted that the term "length of time for which the actuator device is activated" may be interpreted to correspond to a ratio of a total length of activation time of the actuator device with respect to a sum of the total length of the activation time and a total length of non-activation time of the actuator device.

(18) The controller according to any one of modes (1)–(17), further including a wave-intensity-characteristic obtaining portion operable to measure the intensity of the wave, and obtain, as each of the above-described at least one wave intensity characteristic, a wave intensity characteristic on the basis of the measured intensity of the wave.

In the controller constructed according to this mode (18), the wave intensity characteristic is obtained by the controller per se. Since the wave intensity characteristic is proper to each individual vehicle and could vary from vehicle to vehicle, the actuator device can be controlled in a manner suitable for the vehicle in question, by using the wave intensity characteristic obtained by the controller itself. Further, the wave intensity characteristic could be chronologically changed, for example, due to aging of the actuator device and other components of the vehicle. Also in view of this, the determination of the target value on the basis of updated data of the wave intensity characteristic enables the actuator device to be controlled in a manner suitable for the current condition of the vehicle.

The intensity of the acoustic or vibrational wave can be measured, for example, by using a sensor (e.g., a device capable of measuring an acoustic pressure level, and a vibrometer capable of measuring a vibrational amplitude) which is disposed in a suitable position within a passengers' compartment of the vehicle, for detecting the acoustic or vibrational wave. The wave intensity is continuously or successively measured by such a sensor, while the amount of the output of the motor is being made changed. That is, the wave intensity is measured in each of various levels of the output index. The wave intensity characteristic can be obtained by associating a plurality of measured values of the wave intensity with the respective levels of the output index. The thus obtained wave intensity characteristic may be stored in the above-described wave-intensity-characteristic storing portion, so as to be available in the determination of the target value. It is preferable that the wave intensity characteristic is obtained, for example, while the engine is being stopped, namely, while there does not exist any disturbance which is likely to affect the measurement of the wave intensity. However, if a degree of influence exerted by the disturbance to the measurement is known, or if the influence by the wave is excludable from the measurement, the wave intensity characteristic can be accurately obtained in any stage, even in presence of the disturbance.

(19) The controller according to mode (18), wherein the wave-intensity-characteristic obtaining portion obtains, as each of the above-described at least one wave intensity characteristic, the wave intensity characteristic corresponding to a level in a characteristic changing factor which causes the relationship between the propagated wave intensity and the output index to be changed.

As described above, where there exists the characteristic changing factor, the wave intensity characteristic could be changed depending upon the level in the characteristic changing factor. It is accordingly preferable that the wave intensity characteristic is obtained on the basis of the level in the characteristic changing factor. This mode (19) can be embodied advantageously together with the above mode in which the wave intensity characteristic (on the basis of which the target value is determined) is changed depending upon the level in the characteristic changing factor. That is, the above-described wave-intensity-characteristic storing portion may be arranged to store therein a plurality of wave intensity characteristics as alternative characteristics which are associated with the respective different levels in the characteristic changing factor. In this arrangement, it is possible to determine the target value on the basis of the wave intensity characteristic which is selected from among the alternative characteristics and which corresponds to the level in the characteristic changing factor upon the determination of the target value.

(20) The controller according to mode (18) or (19), further including an abnormality detecting portion operable to detect an abnormality of at least one of the vehicle and the actuator device.

In the event of abnormality encountered in a construction providing the wave propagation path or in the actuator device itself, the intensity of the propagated wave is likely to be changed. The controller constructed according to this mode (20) serves to detect an abnormality of the vehicle and/or the actuator device, by detecting a change in the propagated wave intensity on the basis of the wave intensity characteristic which is obtained by itself. The present controller is capable of detecting even a small change which is not commonly detectable by the vehicle occupant, and accordingly detecting an abnormality in an early stage. A process or manner of detecting or determining the abnormality is not particularly limited. However, the abnormality detection or determination can be made, for example, by comparing the currently obtained wave intensity characteristic with the last obtained wave intensity characteristic or the predetermined wave intensity characteristic serving as a standard characteristic. Described specifically, it is possible to determine that the vehicle or/and the actuator device suffers from an abnormality, (i) where the wave-intensity-bottom-value establishing output value in the currently obtained wave intensity characteristic is deviated from that in the last obtained or predetermined wave intensity characteristic by a value exceeding a predetermined threshold, (ii) where the number of the wave-intensity-bottom-value establishing output value or values is increased or reduced in the currently obtained wave intensity characteristic as compared with that in last obtained or predetermined wave intensity characteristic, and (ii) where the bottom value established by the wave-intensity-bottom-value establishing output value is made larger or smaller in the currently obtained wave intensity characteristic than that in the last obtained or predetermined wave intensity characteristic by a value exceeding a predetermined threshold. In the event of detection of the abnormality, the vehicle occupant may be visually or auditorily informed of the abnormality by suitable means such as a display device displaying a warning message in an instrument panel in the passengers' compartment and a sound emitter emitting a warning buzzer, chime or other sound.

(21) The controller according to any one of modes (1)–(20), controlling a pump device as the actuator device which serves as a hydraulic pressure source of a hydraulically operated braking system of the vehicle.

The operating noise and vibration generated by activation of the pump device is a major factor deteriorating the degrees of silence and comfort in the vehicle. The controller constructed according to this mode (21) is capable of reducing such a deteriorating factor and significantly improve the degrees of silence and comfort in the vehicle. It should be noted that the performance of the pump device of the hydraulically operated braking system is not considerably changed even if the amount of the output of the motor is somewhat changed, as long as the change in the output amount of the motor is compensated or offset by change in the length of time of activation of the motor. Accordingly, the pump device as the actuator device can be controlled by changing the output of the motor, without affecting the performance of the pump device. In this respect, the control based on the wave intensity characteristic is advantageously applicable to the control of the pump device. Specifically, the pump device can be controlled in any one of manners which are illustrated in the descriptions relating to some of the above-described modes.

(22) A wave-intensity-characteristic obtainer which is provided in a vehicle equipped with an actuator device operated by a motor, for obtaining a wave intensity characteristic represented by a relationship between (A) a propagated wave intensity indicative of an intensity of a wave which is generated as a result of activation of the actuator device and which is propagated to occupant of the vehicle, and (B) an output index indicative of an amount of an output of the motor, the wave-intensity-characteristic obtainer including: a measuring device operable to measure the intensity of the wave; and a wave-intensity-characteristic obtaining device operable to obtain the wave intensity characteristic on the basis of the measured intensity of the wave.

The wave-intensity-characteristic obtaining portion of the controller according to the above-described modes can be regarded as the wave-intensity-characteristic obtainer of this mode (22). In the vehicle equipped with the wave-intensity-characteristic obtainer, the control based on the wave intensity characteristic can be made accurately, as described above. The wave-intensity-characteristic obtainer may be optionally equipped with the abnormality detecting portion, for enabling easier detection of abnormality of the vehicle and/or actuator device.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

There will be described one embodiment of the present invention in the form of a controller for controlling a pump device of a hydraulically operated braking system, by reference to the accompanying drawings. It is to be understood that the present invention is not limited to the following embodiment, and may be otherwise embodied with various changes and modifications, such as those described in the foregoing "VARIOUS MODES OF THE INVENTION", which may occur to those skilled in the art.

[Hydraulically Operated Braking System]

Figure 1:
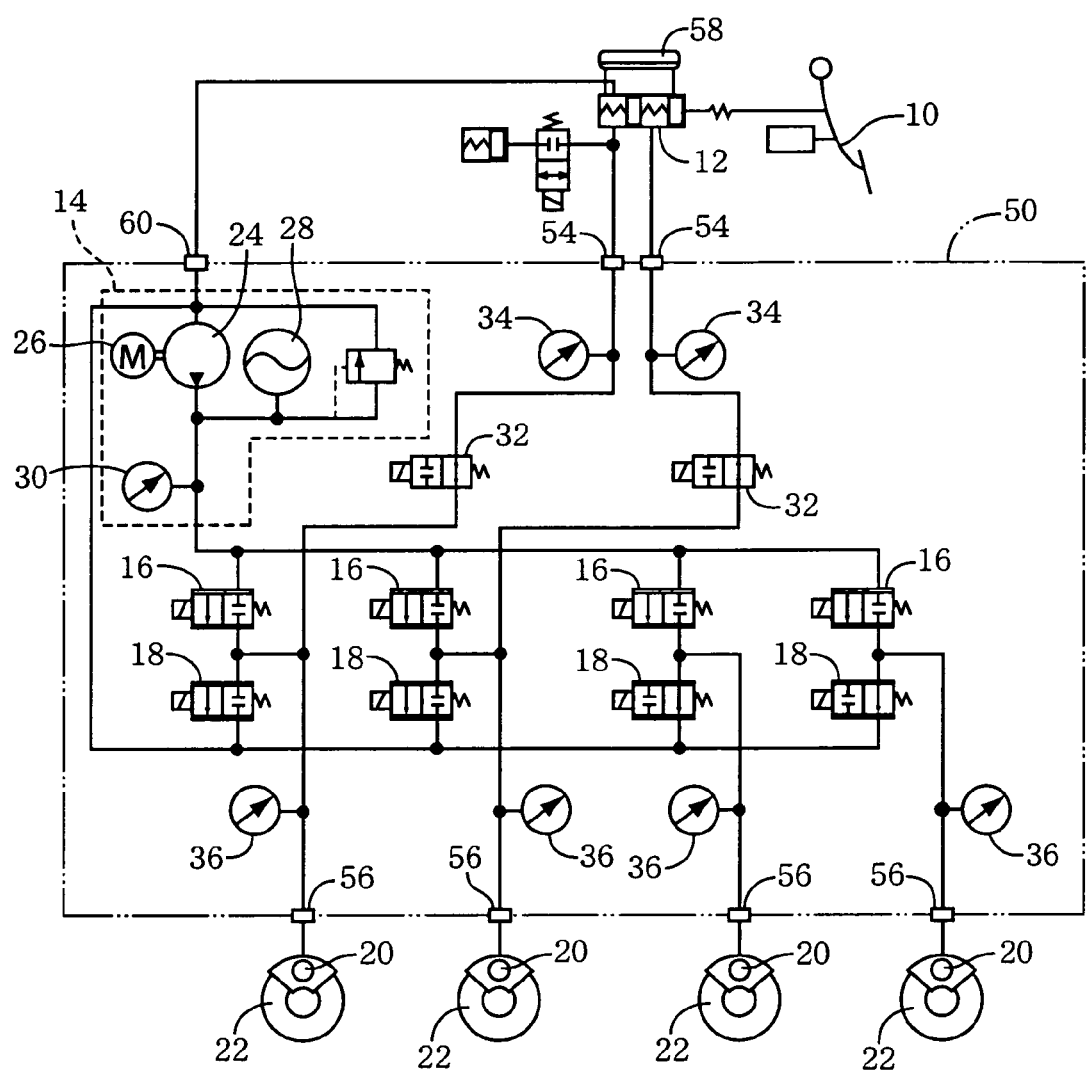
FIG. 1 is a circuit diagram showing a hydraulically operated braking system of a vehicle including a pump device which is controlled by a controller constructed according to an embodiment of the invention.

There will be first described an outline of the hydraulically operated braking system for an automotive vehicle. This braking system is equipped with the pump device as an actuator device which is to be subjected to control achieved by the controller constructed according to the embodiment of the invention. FIG. 1 shows a circuit diagram of the braking system of the embodiment which is very common as a hydraulically operated braking system. The braking system is constructed to include a brake pedal 10, a master cylinder 12, a pump device 14, solenoid-operated linear valves 16, 18 each serving as a pressure increasing or reducing valve for a corresponding one of wheels of the vehicle, and disk brake devices 22 each provided in the corresponding wheel and including a wheel cylinder 20. The pump device 14 includes a plunger pump 24, a motor 26 for operating the plunger pump 26, an accumulator 28, and a pump pressure sensor 30 which is provided by a pressure meter arranged to detect a fluid pressure P in an outlet-side portion of the pump device 14. It is noted that the pressure in the outlet-side portion of the pump device 14 is substantially equal to that in the accumulator 28.

The braking system is controlled by an electronic control unit (hereinafter referred to as "ECU") which is described later. In an usual state, each of electromagnetically-operated master-cylinder cut-off valves 32 (which are provided by normally open valves) is placed in its closed state with application of an electric current thereto, so that the brake devices 22 are activated by the hydraulic pressure generated by the pump device 14. Master-cylinder pressure sensors 34 are provided to detect the pressure in the master cylinder 12 which corresponds to an amount of an operating force exerted to the brake pedal 10 by a driver of the vehicle. Meanwhile, wheel-cylinder pressure sensors 36 are provided to detect the pressure in the respective wheel cylinders 20. The ECU controls an electric current supplied to each of the linear valves 16, 18 such that the pressure in the wheel cylinders 20 corresponds to that in the master cylinder 12. Further, the ECU executes also an anti-lock brake (ABS) control, a traction control (TRC) and a vehicle stability control (VSC) (redundant description of these controls will not be provided). Still further, the ECU controls the pump device 14, too, such that the fluid pressure generated by the pump device 14 is held within a predetermined range whose upper limit is larger, by a predetermined margin amount, than a pressure value which enables each wheel cylinder 20 to provide a predetermined maximum braking force.

[Pump Device]

Figure 2:
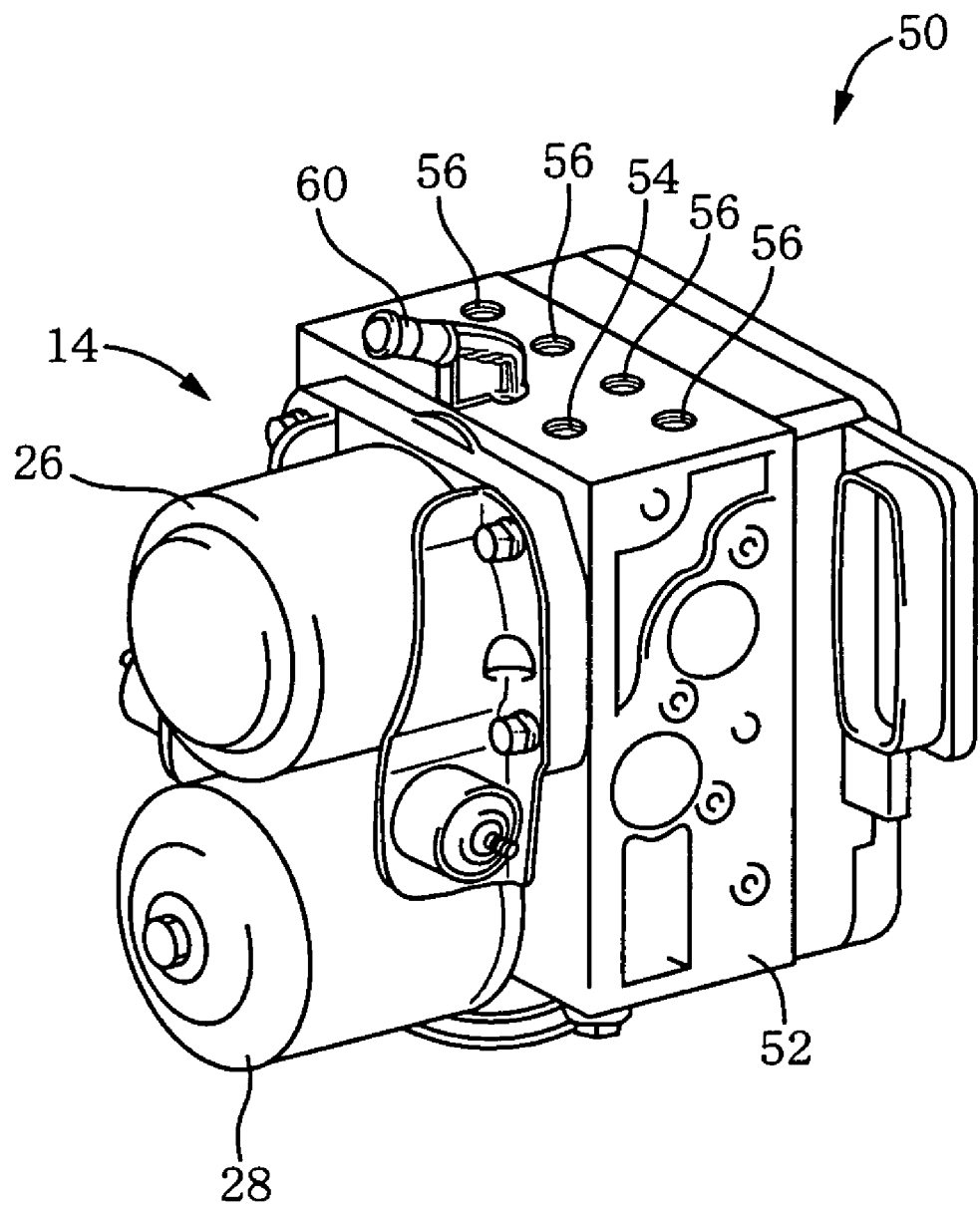
FIG. 2 is a perspective view showing a brake actuator having a pump device built therein.

The braking system includes a portion (surrounded by two-dot chain line in FIG. 1) constituting a single unit which is referred to as an actuator unit 50. As shown in FIG. 2, the actuator unit 50 includes a main body in the form of an actuator block 52, and the above-described motor 26 and accumulator 28 which are attached to the actuator block 52 so as to be located outside the actuator block 52. In an upper surface of the actuator block 52, there are formed two master-cylinder-side ports 54 and four wheel-cylinder-side ports 56. The two master-cylinder-side ports 54 are connected to the master cylinder 12, while the four wheel-cylinder-side ports 56 are connected to the respective four wheel cylinders 20 which are provided in the respective four wheels. On the upper surface of the actuator block 52, there is provided an inlet 60 which is connected to a reservoir 58 provided in the master cylinder 12. The above-described plunger pump 24, linear valves 16, 18, master-cylinder cut-off valves 32, pump pressure sensor 30, master-cylinder pressure sensors 34 and wheel-cylinder pressure sensors 36 are built in the actuator block 52.

Figure 3:
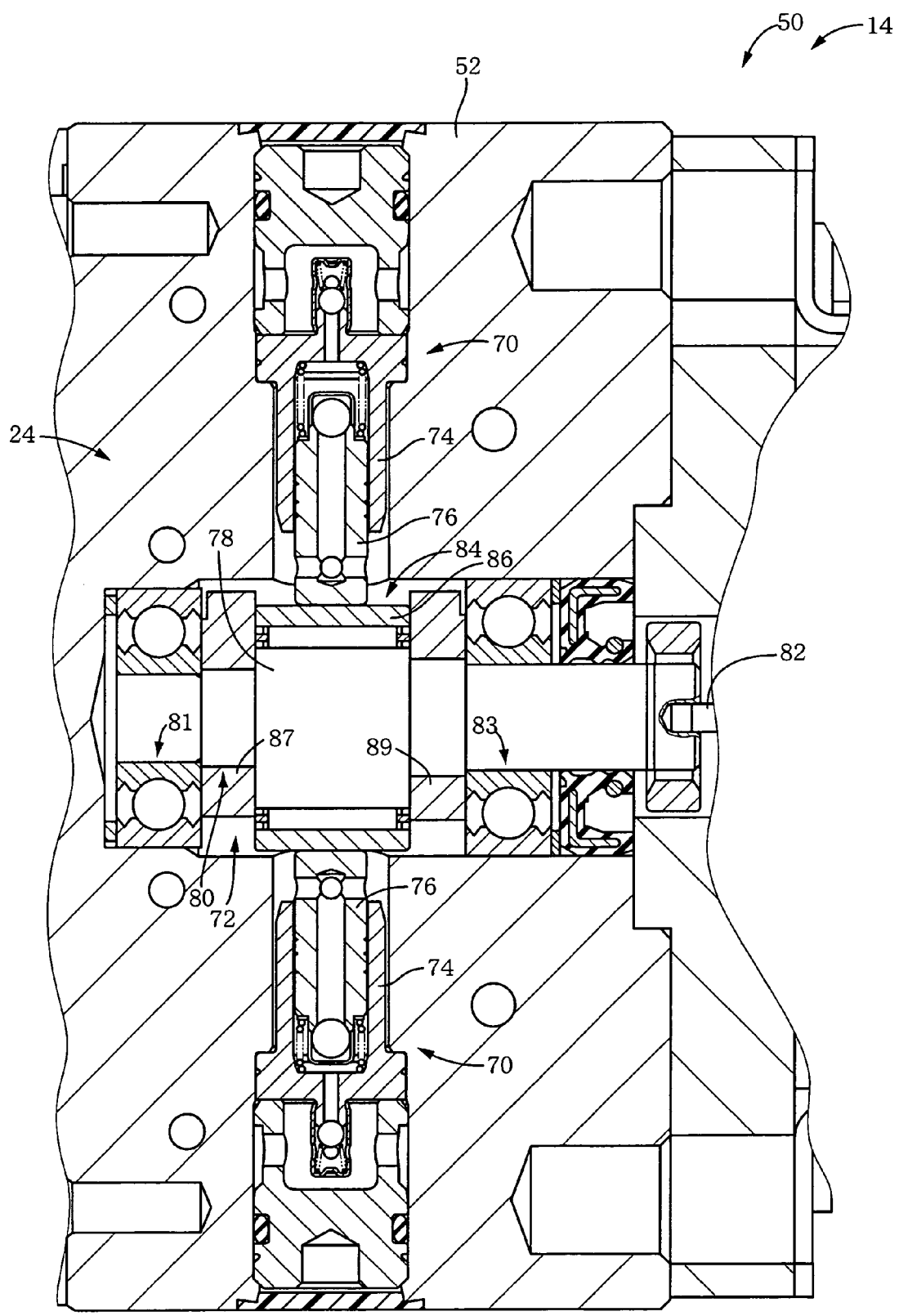
FIG. 3 is a cross sectional view showing a plunger pump constituting the brake actuator of FIG. 2.

The plunger pump 24 is disposed in an upper half portion of the actuator block 52, and has a construction common as a plunger pump, as is apparent from its cross sectional view of FIG. 3. The plunger pump 24 is constructed to include a pair of cylinder devices 70 and an eccentric cam 72 which is interposed between the cylinder devices 70. Each of the cylinder devices 70 includes a generally cylindrical body 74 which has a cylindrical wall and a bottom wall, and a plunger piston 76 which is reciprocatably disposed within in the cylindrical body 74. Meanwhile, the eccentric cam 72 is constituted principally by a cam shaft 80 which includes a eccentric portion 78 and which rotatably supported by the actuator block 52 through bearings 81, 83. The cam shaft 80 is fixed at its axial end portion to an engager portion 82 which is provided by a distal end portion of an output shaft of the motor 26, so as to unrotatable relative to the output shaft of the motor 26, namely, so as to be rotatable together with the output shaft of the motor 26. A bearing 84 is fitted on the eccentric portion 78 of the cam shaft 80, and has an outer race 86 with which the plunger pistons 76 are held in engagement at their axial end portions. With rotation of the cam shaft 80 including the eccentric portion 78, each of the plunger pistons 76 is reciprocated whereby a working fluid is pressurized to be delivered toward the wheel cylinders 20.

The pump device 14, which is constructed as described above, generates operating noise and vibration, during its activation. For example, the operating noise is principally composed of a noise caused upon abutting-contact of axially opposite ends of the outer race 86 of the bearing 84 with spacers 87, 89 which are held in contact with inner rings of the respective bearings 81, 83, as a result of reciprocating motion of the bearing 84 in its axial direction, and a noise caused by vibration of the plunger pump 24. The operating vibration is principally composed of a vibration caused by a dynamic imbalance of the rotating eccentric cam 72, and a vibration caused by an inertial force generated by the reciprocation of the plunger pistons 76. The operating noise and vibration thus generated by the activation of the pump device 14 is propagated to the vehicle occupant, and accordingly constitutes a factor deteriorating the degrees of silence and comfort in the vehicle. The controller of the present embodiment is provided for the purpose of reducing such operating noise and vibration, as described below.

[Disposition of Components of Braking System in Vehicle]

Figure 4:
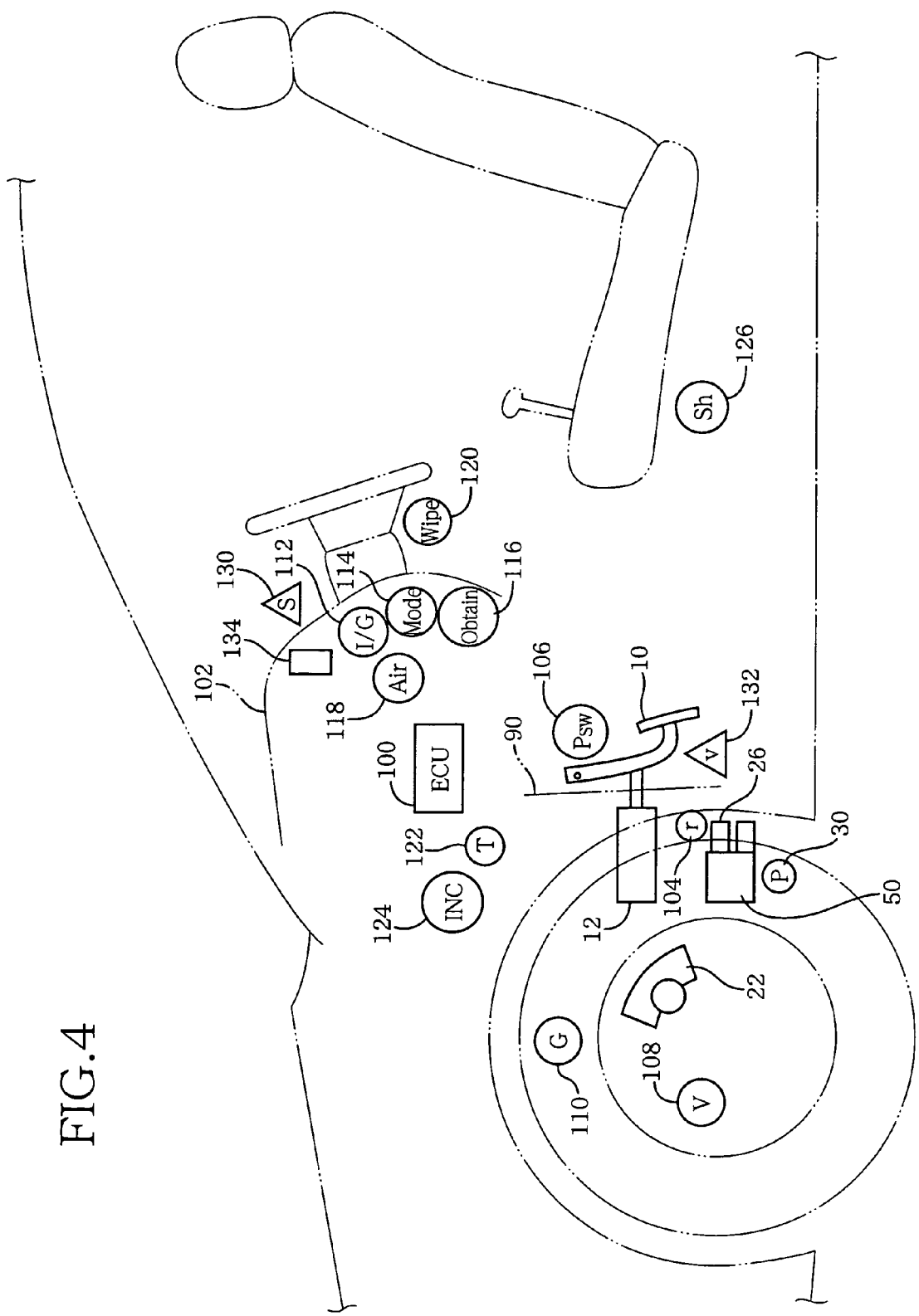
FIG. 4 is a view showing dispositions of components of the hydraulically operated braking system in the vehicle.

As shown in FIG. 4, the brake actuator 50 is disposed in a lower portion of an engine room. The brake pedal 10 is disposed in a passengers' compartment. The master cylinder 12, which is connected to the brake pedal 10, is disposed in the engine room so as to be located on one of opposite sides of a dash panel 90 that is remote from the brake pedal 10. With these components being thus disposed, the operating vibration caused by activation of the pump device 14 is propagated to the brake pedal 10, for example, via a pipeline connecting the brake actuator 50 and the master cylinder 12. Meanwhile, the operating noise caused by activation of the pump device 14 is propagated through the dash panel 90 toward the passengers' compartment, so as to be audible to the vehicle occupant.

In FIG. 4, reference numeral 100 denotes the controller in the form of the ECU (electronic control unit) which is provided in the braking system. The ECU 100 is principally constituted by a computer, and is disposed deep inside an instrument panel 102.

The braking system has a lager number of sensors, switches and the like for enabling various controls to be achieved. The sensors and switches are disposed in respective positions, as shown in FIG. 4 in which only those related to the control of the pump device 14 are marked with circles "○". Specifically described, the brake actuator 50 is provided with the above-described pump pressure sensor 30 and a motor rotation sensor (r) 104 which is constituted principally by an optical rotary encoder for detecting a rotational velocity (e.g., number of revolutions per minute) of the motor 26. A pedal switch (Psw) 106 is disposed in a pedal supporter supporting the brake pedal 10 so as to detect operation of the brake pedal 10 made by the vehicle driver. In a suspension device for supporting each wheel, there are provided a rotational velocity sensor (V) 108 and a vertical acceleration sensor (G) 110 for detecting a rotational velocity of the wheel and detecting an acceleration of vertical displacement of the wheel, respectively. The instrument panel 102 is provided with an ignition switch (I/G) 112 operable to start the engine for driving the vehicle, a mode selector switch (Mode) 114 for selecting one of alternative control modes in the ECU 100, a characteristic obtaining switch (Obtain) 116 operable to obtain a characteristic of the intensity of acoustic or vibrational wave (i.e., the operating noise and vibration), an air conditioner sensor (Air) 118 for detecting an activation state of an air conditioner. In a combination switch extending from a steering column, there is provided a wiper switch (Wipe) 120 which is operable to activate a window wiper. In the vicinity of the ECU 100, there are provided a temperature sensor (T) 122 and an inclination sensor (INC) 124 for detecting the ambient temperature in an area surrounding the braking system and detecting an inclination of the vehicle in its longitudinal direction, respectively. In a gear train box of a transmission, there is provided a shift position sensor (Sh) 126 for detecting a currently selected position of a shift member (e.g., shift lever) for the transmission. Further, as measuring devices for obtaining the wave intensity characteristic, a sound pressure meter (s) 130 and a vibration meter (v) 132 are provided in the instrument panel 102 and the brake pedal 10, respectively, for measuring the intensities of the operating noise and vibration. These meters 130, 132 are marked with triangles "Δ" in FIG. 4.

The above-describe sensors and switches are connected to the ECU 100, whereby information represented by them are inputted to the ECU 100. It is noted that the instrument panel 102 is provided with also a warning device 134 which is activated in the event of abnormality of the brake actuator 50 and other device, to inform the vehicle occupant of this fact.

[Wave Intensity Characteristic]

Figure 5:
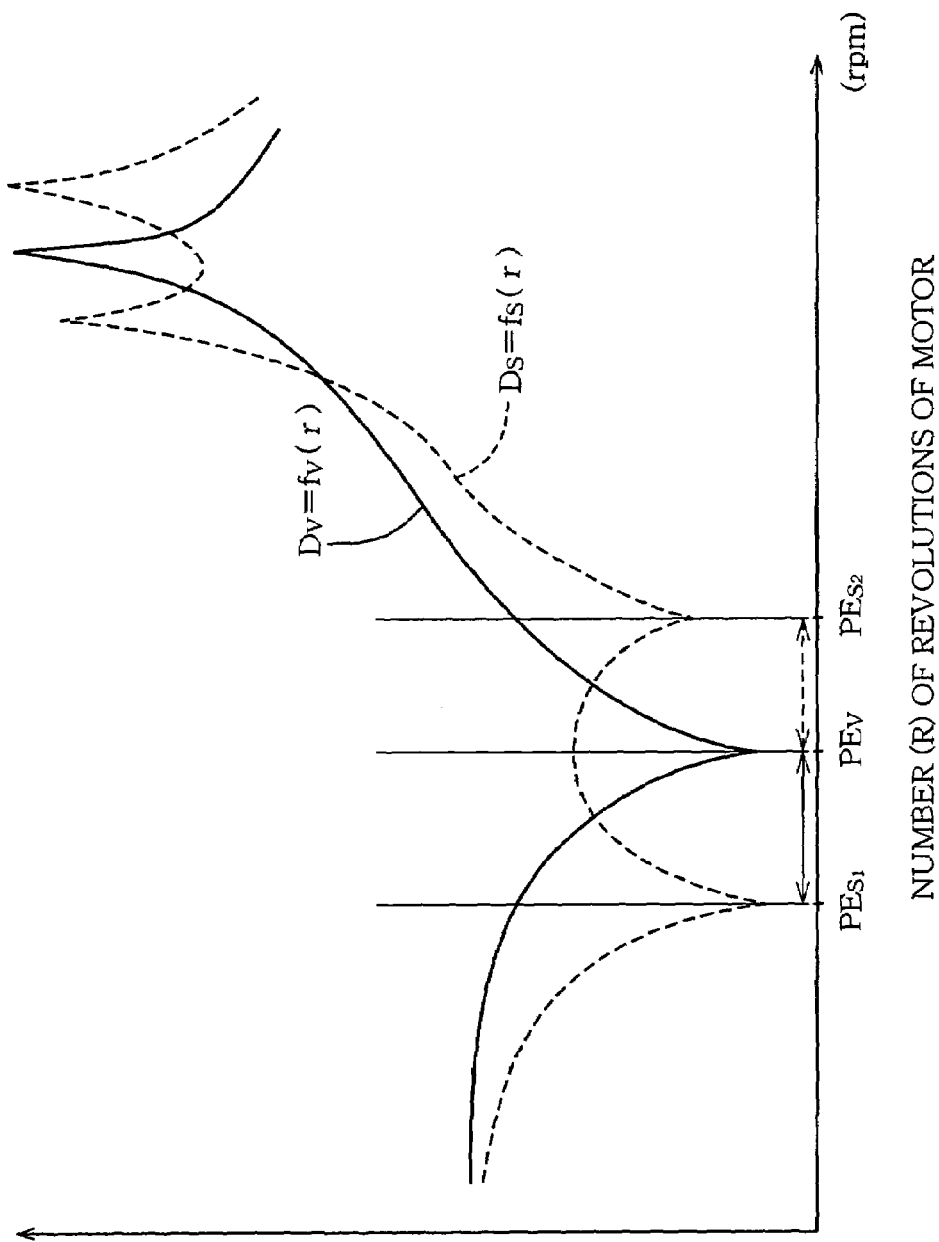
FIG. 5 is a graph showing examples of characteristics of intensities of acoustic and vibrational waves which are generated by activation of the pump device and are propagated to occupant of the vehicle.

The operating noise and vibration, as the acoustic and vibrational waves generated as a result of activation of the pump device 14 and propagated to the vehicle occupant, have respective wave intensity characteristics, as shown in graph of FIG. 5 by way of examples. In the graph in which its horizontal axis represents an output index of the motor 26 in the form of the number r of revolutions (rpm) of the motor 26 while its vertical axis represents an intensity D of the propagated wave, the acoustic wave intensity characteristic is indicated by a broken line while the vibrational wave intensity characteristic is indicated by a solid line. The propagated acoustic wave intensity $D_s$ is an intensity measured based on its acoustic pressure while the propagated vibrational wave intensity $D_v$ is an intensity measured based on its vibrational amplitude. Although the propagated acoustic wave intensity $D_s$ and the propagated vibrational wave intensity $D_v$ are thus measured differently from each other, both of them are represented in an arbitrary unit (a.u.) common to them, so as to be both drawn in the single graph.

The propagated vibrational wave intensity $D_v$ is measured by the above-described vibration meter 132. In the interest of simplifying the explanation of the present embodiment of the invention, only a part of the vibration propagated via the brake pedal 10 is subjected to the control achieved by the ECU 100 in the present embodiment, although the vibration actually could be propagated to the vehicle occupant via not only the brake pedal 10 but also an element or elements other than the brake pedal 10. Meanwhile, the propagated acoustic wave intensity $D_s$ is measured by the above-described sound pressure meter 130. Like in the propagated vibration, for simplifying the explanation, in the present embodiment, the propagated noise is handled on an assumption that the acoustic wave intensity measured by the sound pressure meter 130 is substantially equal to the intensity of the sound or noise coming to ears of the vehicle occupant, although they actually could be somewhat different in level. The vibrational wave intensity characteristic and the acoustic wave intensity characteristic are represented by relationships which can be expressed by expressions (1), (2) as described below. As is apparent of the expressions (1), (2), the vibrational wave intensity and the acoustic wave intensity can be defined as functions of a variable in the form of the number r of revolutions of the motor 26. Each of these functions is thought to conceptually include a so-called transfer function.

$$D_V = f_V(r) \tag{1}$$

$$D_S = f_S(r) \tag{2}$$

where $D_V$ represents propagated vibrational wave intensity $D_S$ represents propagated acoustic wave intensity r represents number of revolutions (rpm) of motor.

As is apparent from the graph of FIG. 5, in the vibrational wave intensity characteristic, there are one wave-intensity-peak-value establishing output value and one wave-intensity-bottom-value establishing output value in the number of revolutions of the motor 26 which establish a peak value and a bottom value in the propagated vibrational wave intensity $D_V$, respectively. It is thought that the peak value and the bottom value are respectively established due to resonance phenomenon and antiresonance phenomenon that is a phenomenon opposite to the resonance phenomenon. In the acoustic wave intensity characteristic, on the other hands, there are two wave-intensity-peak-value establishing output values and two wave-intensity-bottom-value establishing output values in the number of revolutions of the motor 26. For satisfactorily improving the degrees of silence and comfort in the vehicle, it is desirable that the motor 26 is rotated at a number r of revolutions which establishes a bottom value each in the vibrational wave intensity $D_V$ and acoustic wave intensity $D_S$. However, the wave-intensity-bottom-value establishing output value in the vibrational wave intensity characteristic is different from either one of the wave-intensity-bottom-value establishing output values in the acoustic wave intensity characteristic, namely, any value in the number r of revolutions of the motor 26 can not establish a bottom value in the acoustic wave intensity Ds as well as in the vibrational wave intensity Dv. In view of such a situation, the motor 26 is controlled to be rotated at a suitable number r of revolutions, as described later in detail. The control is achieved based on a number r of revolutions of the motor 26 as a kind of the wave-intensity-bottom-value establishing output value which establishes a bottom value in the propagated wave intensity D, which number is referred to as a wave-intensity-bottom-value establishing number PE of revolutions. The number r of revolutions of the motor 26, which establishes the bottom value in the vibrational wave intensity $D_V$, is referred to as a vibrational-wave-intensity-bottom-value establishing number $PE_V$ of revolutions. Similarly, the numbers r of revolutions of the motor 26, which establish the respective bottom values in the acoustic wave intensity $D_S$, are referred to as acoustic-wave-intensity-bottom-value establishing numbers $PE_S$ of revolutions. A lower one of the numbers $PE_S$ of revolutions is referred to as $PE_{S1}$, while a higher one of the numbers $PE_S$ of revolutions is referred to as $PE_{S2}$. In the acoustic wave intensity characteristic shown in FIG. 5, the wave intensity $D_S$ is lower at the lower acoustic-wave-intensity-bottom-value establishing number $PE_{S1}$ of revolutions, than at the higher acoustic-wave-intensity-bottom-value establishing number $PE_{S2}$ of revolutions.

Each of the vibrational wave intensity characteristic and acoustic wave intensity characteristic shown in FIG. 5 is changed with change in a particular factor or factors. For instance, with change in the ambient temperature T in an area surrounding the braking system, the wave intensity characteristic is likely to be changed due to change in a viscosity of the brake working fluid, expansion or contraction of the vehicle body and other vehicle components, and change in hardness of a rubber member constituting an insulator supporting the brake actuator 50. As the wave intensity characteristic is thus changed, the propagated wave intensity D is changed in the same number r of revolutions of the motor 26. Further, the change of the wave intensity characteristic leads to change of the wave-intensity-bottom-value establishing number PE of revolutions and also change of the bottom value in the propagated wave intensity D which are established by the wave-intensity-bottom-value establishing number PE of revolutions. In the present embodiment, therefore, the ambient temperature T as a kind of environment surrounding the vehicle is treated as one of characteristic changing factor, so that the control is achieved based on the wave intensity characteristic corresponding to the current level in the ambient temperature T.

[Various Portions of Electronic Control Unit]

Figure 6:
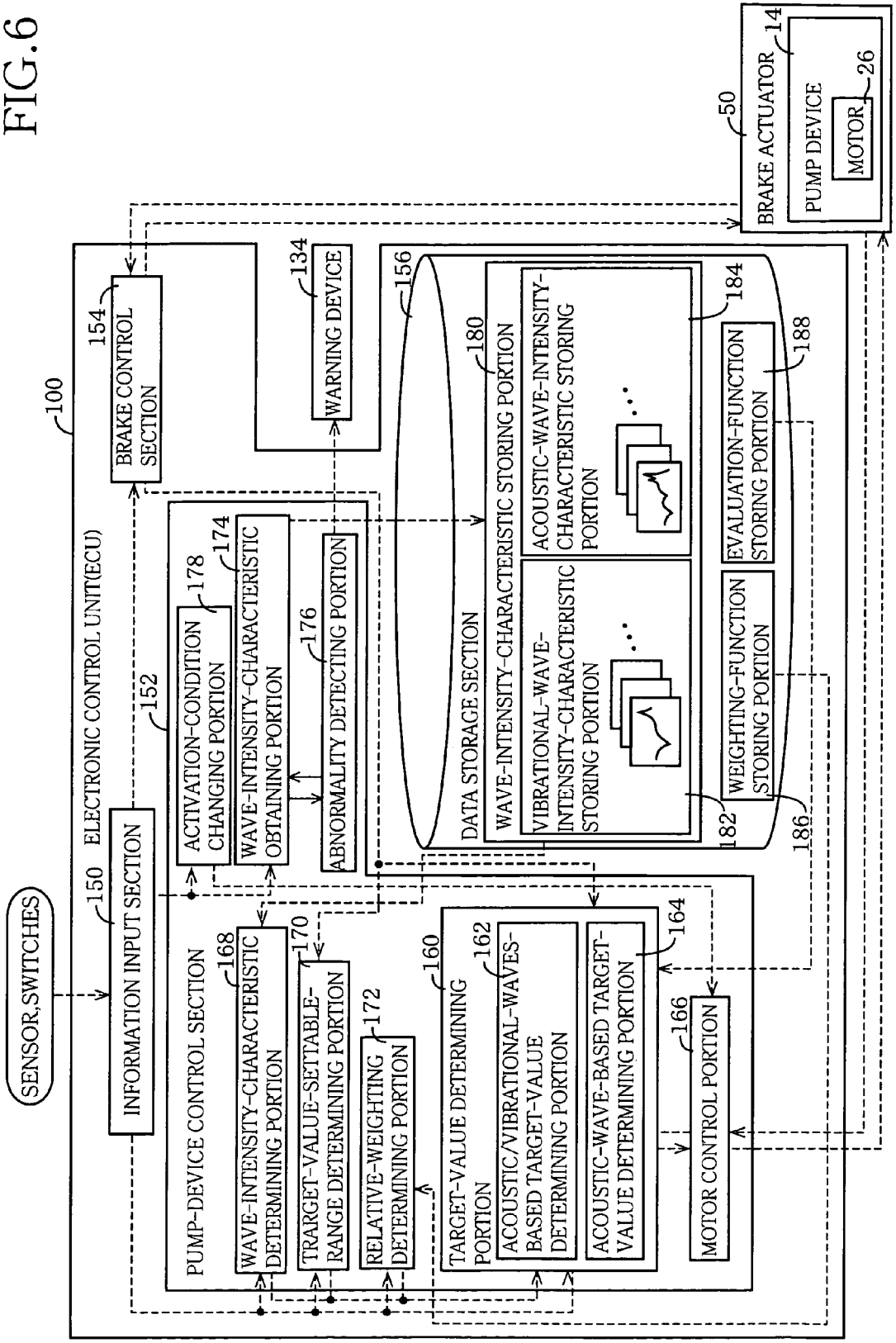
FIG. 6 is a block diagram showing various portions of an electronic control unit (ECU) which includes the controller of the embodiment of the invention.

The ECU (electronic control unit) 100 is principally constituted by the computer, and is given various portions having respective functions as shown in a block diagram of FIG. 6 (which mainly shows a part of the ECU 100 closely related to the present invention). The ECU 100 is can be sectioned into four principal sections consisting of an information input section 150, a pump-device control section 152, a brake control section 154 and data storage section 156. The information input section 150 receives information which is required for the controls achieved by the ECU 100 and which is transmitted from the above-described various sensors and switches. The pump-device control section 152 executes the control relating to the present invention, namely, controls the pump device 14 on the basis of the wave intensity characteristic. The brake control section 154 controls the solenoid-operated linear valves 16, 18 such that a braking force proportional to an amount of the operating force exerted to the brake pedal 10 is generated. The brake control section 154 also executes the anti-lock brake (ABS) control, traction control (TRC) and vehicle stability control (VSC). The data storage section 156 stores various data required for the controls.

The pump-device control section 152, which controls the pump device 14 on the basis of the wave intensity characteristic, can be divided into the portions having the respective functions, as described below.

A target-value determining portion 160, serving as a core portion of the pump-device control section 152, determines a target number r* of revolutions of the motor 26 as a target value, on the basis of which the motor 26 is controlled. The target-value determining portion 160 includes an acoustic/vibrational-waves-based target-value determining portion 162 operable to determine the target number r* of revolutions on the basis of the acoustic wave intensity characteristic and the vibrational wave intensity characteristic, and an acoustic-wave-based target-value determining portion 164 operable to determine the target number r* of revolutions on the basis of only the acoustic wave intensity characteristic. That is, in the target-value determining portion 160, a selected one of the two determining portions 162, 164 is operated to determine the target number r* of revolutions. A motor control portion 166 controls the motor 26 based on the target number r* of revolutions which is determined by the target-value determining portion 160. It is noted that the number r of revolutions of the motor 26 is controlled with a feedback control system, as described below.

A wave-intensity-characteristic determining portion 168 is operated prior to the determination of the target number r* of revolutions made by the target-value determining portion 160, to determine the wave intensity characteristic on the basis of which the target number r* of revolutions is determined. A target-value-settable-range determining portion 170 determines a target-value settable range within which the target value in the form of the target number r* of revolutions is settable by the target-value determining portion 160. A relative-weighting determining portion 172 determines a relative weighting that is to be given to each of the acoustic wave intensity characteristic and the vibrational wave intensity characteristic, so that the above-described acoustic/vibrational-waves-based target-value determining portion 162 can determine the target number r* of revolutions on the basis of the acoustic wave intensity characteristic and vibrational wave intensity characteristic each of which the relative weighting is given.

In the present embodiment, the wave intensity characteristic, on which is based in the determination of the target number r* of revolutions by the target-value determining portion 160, is obtained on the basis of the intensity of the propagated wave which is measured in the subject vehicle. A procedure for obtaining the wave intensity characteristic is executed by a wave-intensity-characteristic obtaining portion 174 which is included in the pump-device control section 152. Further, the obtained wave intensity characteristic is utilized for detecting an abnormality of the vehicle or the pump device 14, so that a fact of the detection of the abnormality is informed to the vehicle occupant through the above-described warning device 134. A procedure for detecting the abnormality is executed by an abnormality detecting portion 176 which is also included in the pump-device control section 152.

The pump-device control section 152 executes also a control which is not directly related to the wave intensity characteristic. This control is executed by changing an activation condition which is to be satisfied to cause the pump device 14 to be activated. In the hydraulically operated braking system in which the activation of the pump device 14 is initiated when the fluid pressure P detected by the above-described pump pressure sensor 30 becomes lower than a threshold, the above-described activation condition is that the fluid pressure P is lower than the threshold. That is, the control is executed by making the threshold lower in a particular state than in a usual state. The threshold is lowered, namely, the pump activation condition is changed by an activation-condition changing portion 178 which is also included in the pump-device control section 152. It is noted that the threshold may be referred to as a pump-activation initiation pressure $P_L$.

The data storage section 156 also can be divided into a plurality of portions having respective functions. A wave-intensity-characteristic storing portion 180 stores various wave intensity characteristics serving as alternatives among which at least one wave intensity characteristic is selected, so that the target-value determining portion 160 determines the target number r* of revolutions of the motor 26 on the basis of the selected wave intensity characteristic or characteristics. Described more specifically, the wave-intensity-characteristic storing portion 180 includes a vibrational-wave-intensity-characteristic storing portion 182 storing a plurality of vibrational wave intensity characteristics, and an acoustic-wave-intensity-characteristic storing portion 184 storing a plurality of acoustic wave intensity characteristics. It is noted that the plurality of vibrational and acoustic wave intensity characteristics are obtained under various levels in the ambient temperature T which are set in a discrete manner. In the present embodiment, the plurality of wave intensity characteristics are obtained under discrete values of the ambient temperature T, with a constant interval between the adjacent values being 2° C. The data storage section 156 further includes a weighting-function storing portion 186 and an evaluation-function storing portion 188 storing a weighting function and an evaluation function, respectively, which are used as rules in the determination of the target number r* of revolutions made by the target-value determining portion 160.

The outline of the overall construction of the ECU 100 has been described. The function and role of each portion of the ECU 100 will be described more in detail in the following description as to the controls achieved by the ECU 100. It is noted that the controller according to the embodiment of the invention is constituted principally by the above-described pump-device control section 152 and data storage section 156 of the ECU 100. It is further noted that the ECU 100 is constituted principally by the computer equipped with two CPUs, such that the pump-device control section 152 and data storage section 156 are incorporated in the respective two CPUs so as to be arranged to execute the controls individually from each other.

[Control of Pump Device by Controller]

Figure 7:
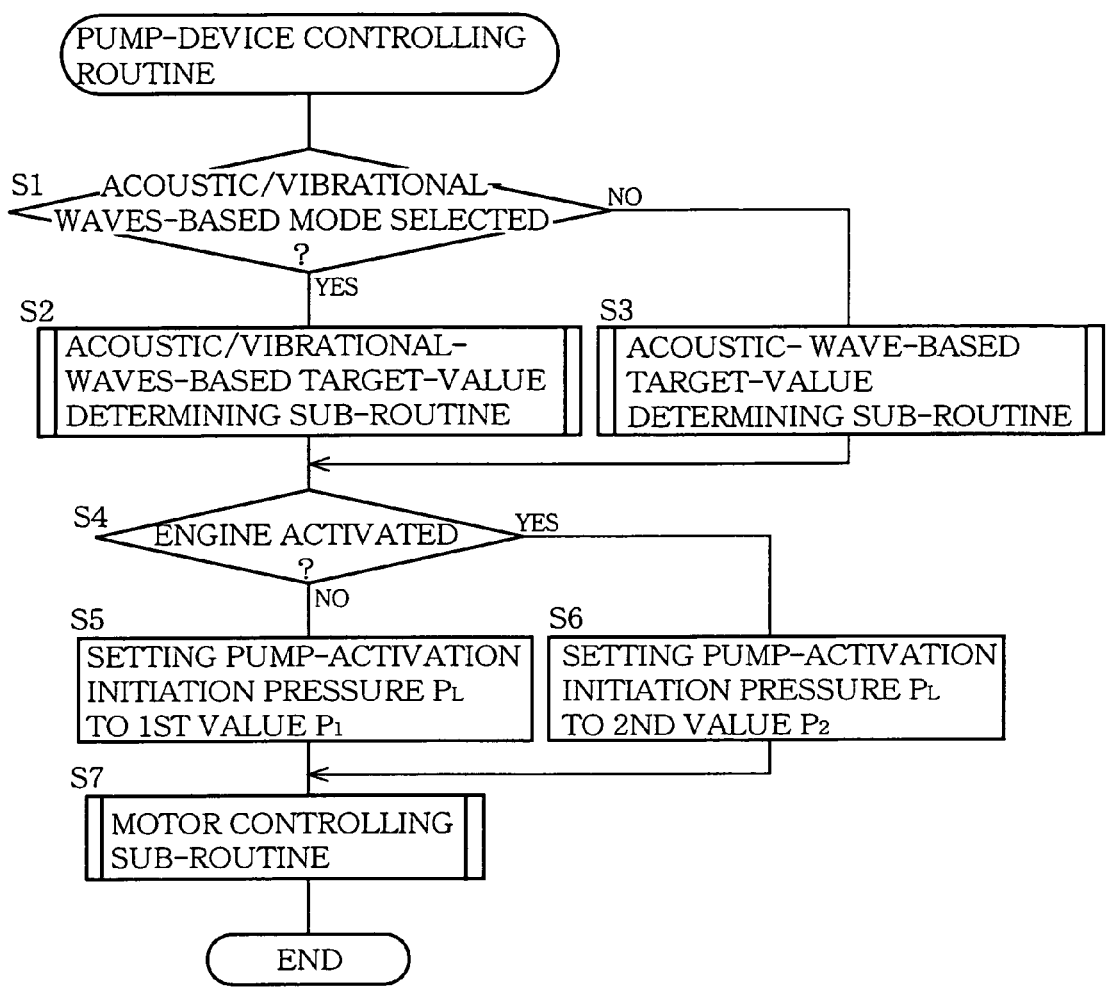
FIG. 7 is a flow chart showing a pump device controlling routine executed in the controller of the embodiment of the invention.

The pump device 14 is controlled by the pump-device control section 152 of the ECU 100, in accordance with a pump-device controlling routine illustrated in a flow chart of FIG. 7. This pump-device controlling routine is repeatedly executed at a short time interval (e.g., several tens of milliseconds). Hereinafter, the controls achieved by the controller will be described in detail by reference to the flow charts of FIGS. 7–9 and 12–14.

In each cycle of execution of this pump-device controlling routine, step S1 is initially implemented to determine which one of two alternative modes is currently selected by the mode selector switch 114 provided in the instrument panel 102. The two alternative modes consist of an acoustic/vibrational-waves-based mode for determining the target number r* of revolutions on the basis of the acoustic wave intensity characteristic and the vibrational wave intensity characteristic, and an acoustic-wave-based mode for determining the target number r* of revolutions on the basis of only the acoustic wave intensity characteristic. If the acoustic/vibrational-waves-based mode is selected, the control flow goes to step S2 in which an acoustic/vibrational-waves-based target-value determining sub-routine is implemented. If the acoustic-wave-based mode is selected, the control flow goes to step S3 in which an acoustic-wave-based target-value determining sub-routine is implemented.

Figure 8:
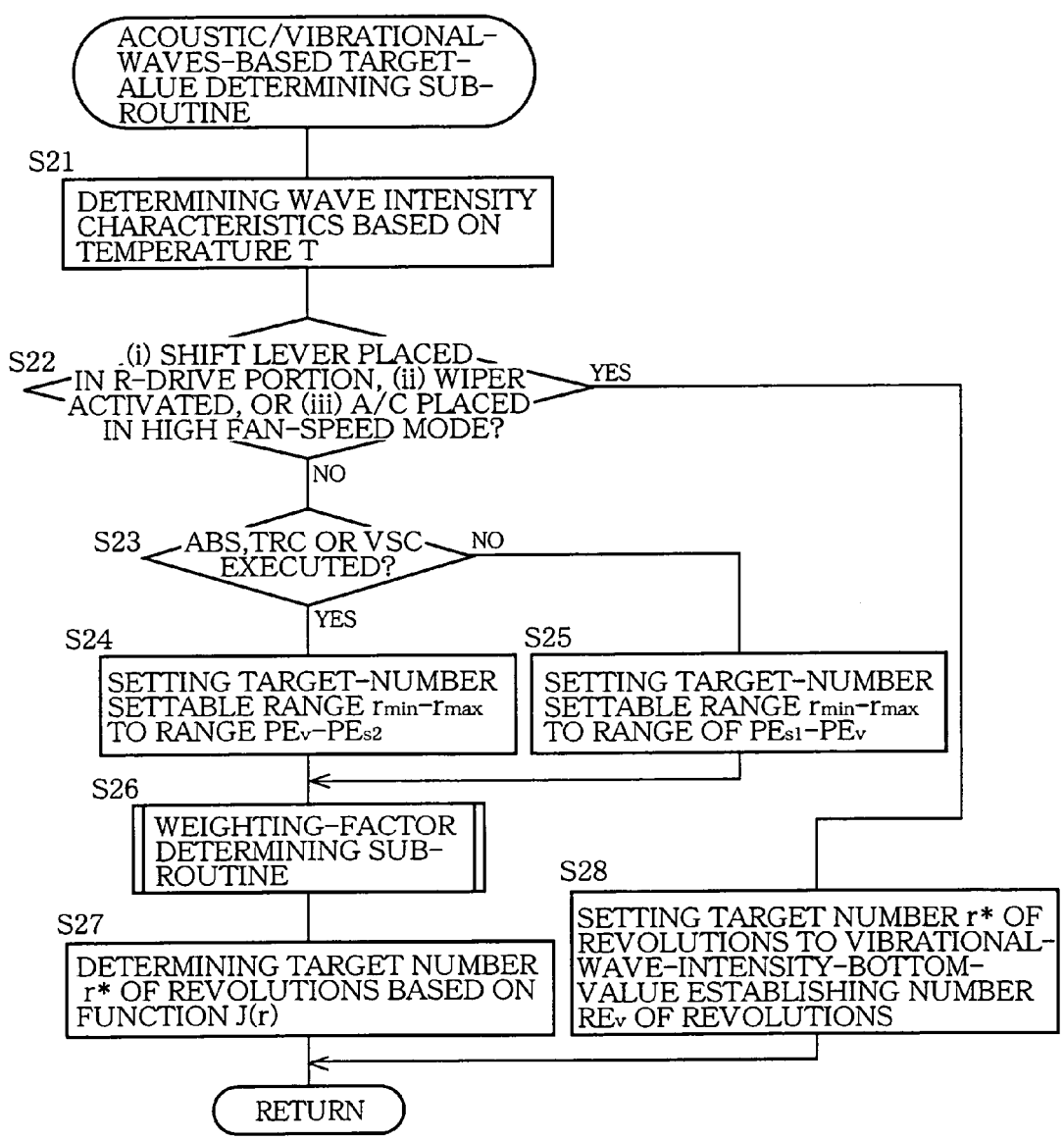
FIG. 8 is a flow chart showing an acoustic/vibrational-waves-based target-value determining sub-routine which constitutes a part of the pump device controlling routine of FIG. 7.

As shown in the flow chart of FIG. 8, the acoustic/vibrational-waves-based target-value determining sub-routine is initiated with step S21 to determine, on the basis of the ambient temperature T, the acoustic wave intensity characteristic and the vibrational wave intensity characteristic, on which are to be based in the determination of the target number r* of revolutions of the motor 26. That is, from among the alternative characteristics stored in the acoustic-wave-intensity-characteristic storing portion 184 and vibrational-wave-intensity-characteristic storing portion 182, the acoustic wave intensity characteristic and vibrational wave intensity characteristic corresponding to the current level in the ambient temperature T (which is detected by the temperature sensor 122) are read out. This step S21 is implemented by the wave-intensity-characteristic determining portion 168. In other words, in this step S21, the wave-intensity-characteristic determining portion 168 determines the acoustic wave intensity characteristic and vibrational wave intensity characteristic on the basis of the ambient temperature T as the characteristic changing factor, or selects each of the acoustic wave intensity characteristic and vibrational wave intensity characteristic from among the alternative characteristics, on the basis of the current level in the characteristic changing factor. It is noted that the description as to the controls will be continued as follows, on an assumption that the characteristics as shown in FIG. 5 have been read out in step S21.

Step S21 is followed by step S22 which is implemented to determine the currently selected position of the shift member for the transmission, whether the window wiper is currently activated or not, and the activation state of the air conditioner, on the basis of output signals transmitted from the above-described shift position sensor 126, wiper switch 120 and air conditioner sensor 118, respectively. The control flows goes to step S28 without steps S23–S27 being implemented, in case of satisfaction of at least one of three conditions which consist of (i) a condition is that the shift member is currently placed in a rear-drive position in the transmission, (ii) a condition is that the window wiper is currently activated, and (iii) a condition is that the air conditioner is currently placed in its high fan speed mode. That is, where at least one of the above-described three conditions is satisfied, it is thought that the noise generated by the activation of the pump device 14 is likely to be less audible to the vehicle occupant, due to a reverse warning buzzer, noise generated by the activation of the window wiper or noise generated by the strong air stream emitted by the air conditioner. Accordingly, in such a case, step S22 is followed by step S28 in which the target number r* of revolutions is set to the vibrational-wave-intensity-bottom-value establishing number $PE_V$ of revolutions. These steps S22 and S28 are implemented by the acoustic/vibrational-waves-based target-value determining portion 162. In other words, in these steps S22 and S28, the acoustic/vibrational-waves-based target-value determining portion 162 selects one of the acoustic-wave-intensity-bottom-value establishing number $PE_S$ of revolutions and vibrational-wave-intensity-bottom-value establishing number $PE_V$ of revolutions on the basis of the various factors related to the vehicle in the form of the operating state of the vehicle and the activation state of the device (which is installed on the vehicle and is other than the pump device 14), and then determines the selected one of the numbers $PE_S$, $PE_V$ as the target number r* of revolutions.

If a negative determination (NO) is obtained in step S22, namely, if any one of the above-described three conditions is not satisfied, step S22 is followed by steps S23–S27. In step S23, it is determined whether at least one of the anti-lock brake control, traction control and vehicle stability control is currently executed by the braking system or not. If an affirmative determination (YES) is obtained in step S23, the control flow goes to step S24 in which a relatively high range is set as a target-value settable range within which the target number r* of revolutions is to be set, because the pump device 14 is commonly required to exhibit a high performance during execution of the anti-lock brake control, traction control and/or vehicle stability control. That is, in step S24, a target-number settable range $r_{min}$–$r_{max}$ as the target-value settable range is determined such that its lower and upper limits $r_{min}$, $r_{max}$ are defined by the above-described vibrational-wave-intensity-bottom-value establishing number $PE_V$ of revolutions and higher acoustic-wave-intensity-bottom-value establishing number $PE_{S2}$ of revolutions. If a negative determination (NO) is obtained in step S23, namely, where the pump device 14 is not thought to be required to exhibit a high performance, the control flow goes to step S25 in which the target-number settable range $r_{min}$–$r_{max}$ is determined such that its lower and upper limits $r_{min}$, $r_{max}$ are defined by the lower acoustic-wave-intensity-bottom-value establishing number $PE_{S1}$ of revolutions and vibrational-wave-intensity-bottom-value establishing number $PE_V$ of revolutions. These steps S23–S25 are implemented by the target-value-settable-range determining portion 170, such that the target-number settable range $r_{min}$–$r_{max}$ is determined to be defined between two wave-intensity-bottom-value establishing number PE of revolutions, which are selected from among at least one acoustic-wave-intensity-bottom-value establishing numbers $PE_S$ of revolutions and at least one vibrational-wave-intensity-bottom-value establishing number $PE_V$ of revolutions on the basis of the operating state of the vehicle as the various factors related to the vehicle.

Figure 9:
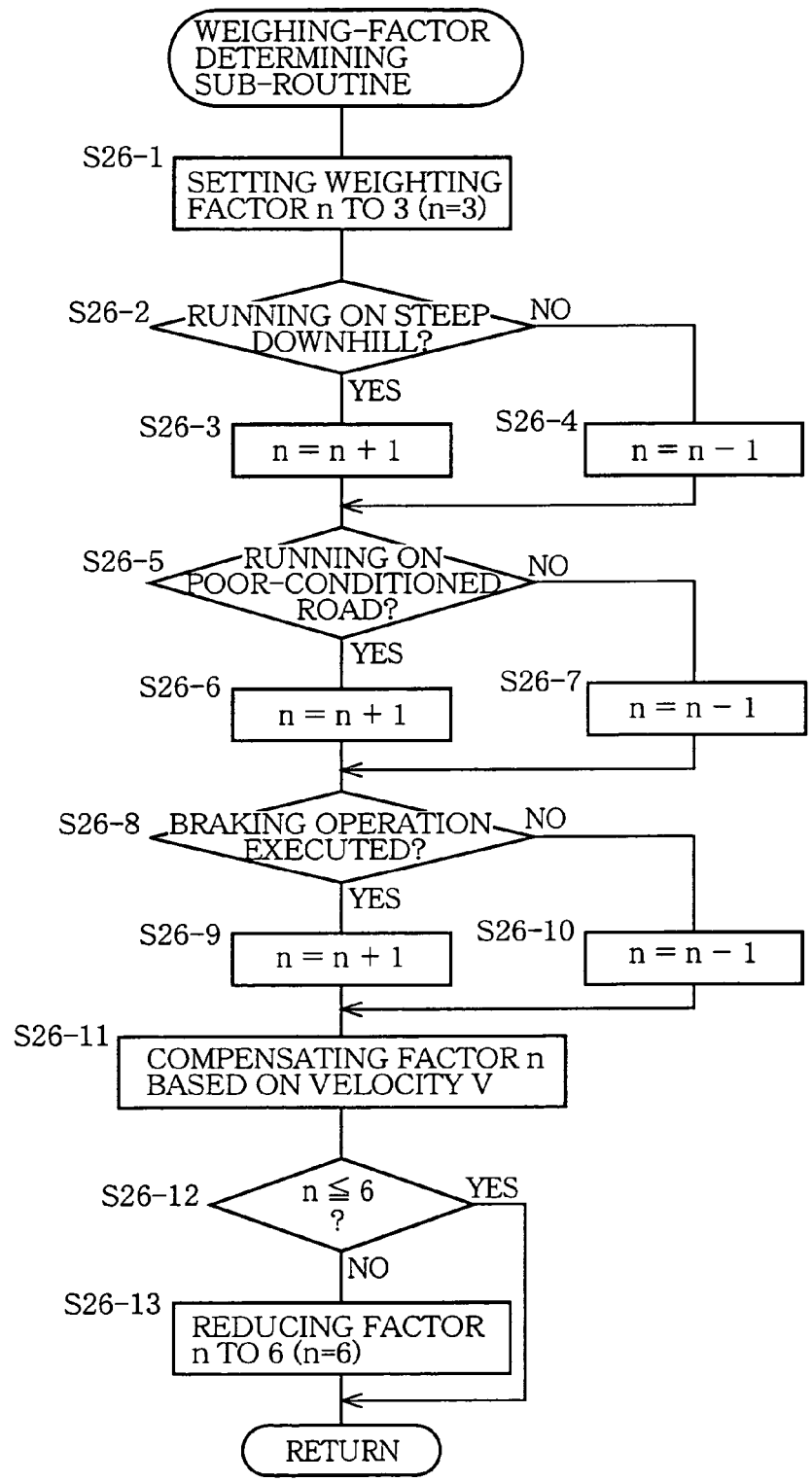
FIG. 9 is a flow chart showing a weighting-factor determining sub-routine which constitutes a part of the acoustic/vibrational-waves-based target-value determining sub-routine of FIG. 8.

After the target-number settable range $r_{min}$–$r_{max}$ has been determined as described above, the control flow goes to step S26 to execute a weighting-factor determining sub-routine illustrated in a flow chart of FIG. 9. A weighting factor indicates a degree of relative importance of the acoustic wave intensity characteristic and the vibrational wave intensity characteristic. In the present embodiment, the weighting factor is represented by one of real numbers from "zero" (0) to "six" (6), such that the representing number is increased with a relatively large importance given to the vibrational wave intensity characteristic while the representing number is reduced with a relatively large importance given to the acoustic wave intensity characteristic. The weighting-factor determining sub-routine is initiated with step S26-1 in which the weighting factor n is initially set to an intermediate value, i.e., "three" (3).

Subsequently, step S26-2 is implemented to determine whether or not the vehicle is currently running on a steep downhill road whose degree of slope or inclination is higher than a predetermined threshold, on the basis of the information transmitted from the inclination sensor 124. While the vehicle is running on a downhill road having a high degree of slope, the vehicle driver is likely to be sensitive to the vibration through the brake pedal 10, since there is a high probability that a braking operation is carried out by the driver. In view of this, if an affirmative determination (YES) is obtained in step S26-2, a larger importance is given to the vibration, so that step S26-3 is implemented to add "one" (1) to the weighting factor n. If a negative determination (NO) is obtained in step S26-2, the control flow goes to step S26-4 to subtract "one" (1) from the weighting factor n.

Next, step S26-5 is implemented to determine whether the vehicle is currently running on a poor-conditioned road such as a bumpy road or not. While the vehicle is running on the poor-conditioned road, the vehicle occupant is unlikely to be so sensitive to the noise generated by the activation of the pump device 14, due to presence of a large road noise. If an affirmative determination (YES) is obtained in step S26-5, therefore, a larger importance is given to the vibration, so that step S26-6 is implemented to add "one" (1) to the weighting factor n. If a negative determination (NO) is obtained in step S26-2, the control flow goes to step S26-4 to subtract "one" (1) from the weighting factor n. If a negative determination (NO) is obtained in step S26-5, the control flow goes to step S26-7 to subtract "one" (1) from the weighting factor n.

Next, step S26-8 is implemented to determine, on the basis of the output signal from the pedal switch 106, whether the braking operation is currently carried out by the vehicle driver or not, namely, whether the driver is currently in contact at his foot with the brake pedal 10 or not. While the driver is being in contact at his foot with the brake pedal 10, he is likely to be so sensitive to the vibration generated by the activation of the pump device 14. If an affirmative determination (YES) is obtained in step S26-8, therefore, a larger importance is given to the vibration, so that step S26-9 is implemented to add "one" (1) to the weighting factor n.

If a negative determination (NO) is obtained in step S26-8, the control flow goes to step S26-10 to subtract "one" (1) from the weighting factor n.

Figure 10:
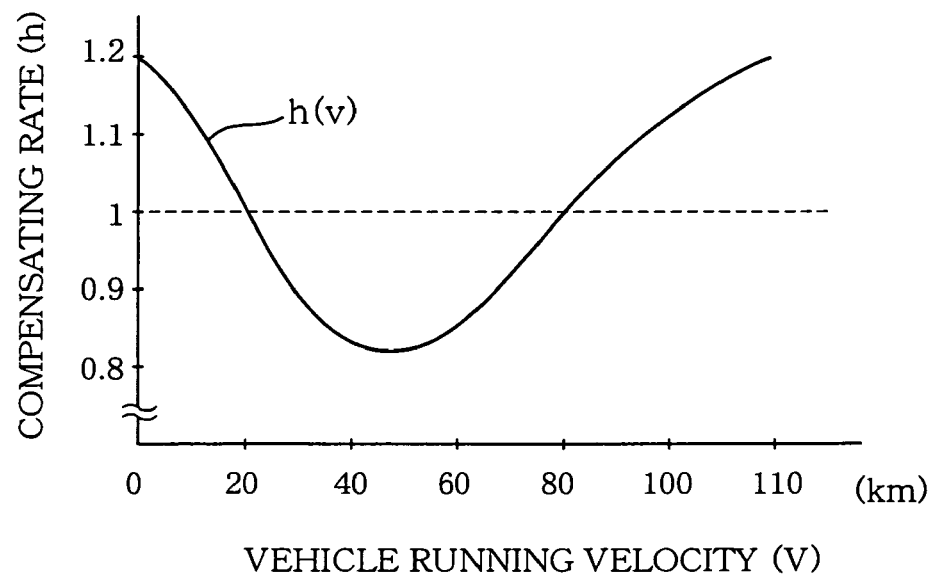
FIG. 10 is a graph showing a relationship between a vehicle running velocity and a compensating rate which is used to compensate a weighting factor in the weighting-factor determining sub-routine of FIG. 9.

Next, step S26-11 is implemented to obtain the running velocity V of the vehicle on the basis of the information from the rotational velocity sensor 108, and then correct or compensate the weighting factor n on the basis of the obtained running velocity V. While the running velocity V is relatively low, there is a high probability that the braking operation is executed to stop the vehicle. On the other hand, while the running velocity V is relatively high, the vehicle occupant is unlikely to be so sensitive to the noise generated by the activation of the pump device 14, due to increased road noise and wind noise. In view of such a tendency, the weighting factor n is compensated with a compensating rate h as indicated in FIG. 10. Specifically described, the weighting factor n is multiplied by the compensating rate h(V) corresponding to the current running velocity V, as expressed by the following expression (3):

$$n = n \times h(V) \qquad (3)$$

Since there is a case where the weighting factor n is made larger than "six" (6) as a result of the compensation, step S26-12 is implemented to determine whether or not the compensated weighting factor n is equal to or smaller than "six" (6). If a negative determination (NO) is obtained in step S26-12, the control flow goes to step S26-13 in which the weighting factor n is compulsorily reduced to "six" (6).

The weighting factor n is determined as described above. The above-described weighting-factor determining sub-routine of step S26 is executed by the relative-weighting determining portion 172, such that the relative weighting is determined on the basis of the various vehicle-related factors such as the running state of the vehicle, the operating state of the vehicle, the activation state of the device which is installed on the vehicle and is other than the pump device 14, and the environment surrounding the vehicle. The weighting-factor determining sub-routine is considered as a procedure for changing the relative weighting such that a larger importance is given to the vibrational wave intensity characteristic in a state in which the vehicle occupant is not so sensitive to the noise.

After the weighting factor n has been determined in step S26, the control flow goes to step S27 to determine the target number r* of revolutions of the motor 26 on the basis of a predetermined evaluation function J(r). This evaluation function J(r) is stored in the evaluation-function storing portion 188, and is expressed by the following expression (4):

$$J(r) = g(n) \cdot Kv \cdot f_V(r) + g(6-n) \cdot Ks \cdot f_S(r) \qquad (4)$$

Figure 11:
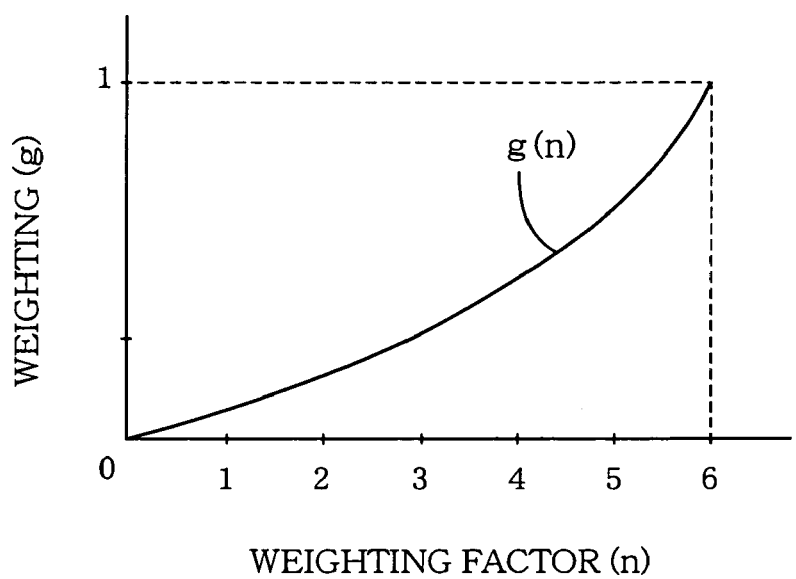
FIG. 11 is a graph showing a weighting function which is used in determination of a target value in the acoustic/vibrational-waves-based target-value determining sub-routine of FIG. 8.
Figure 12:
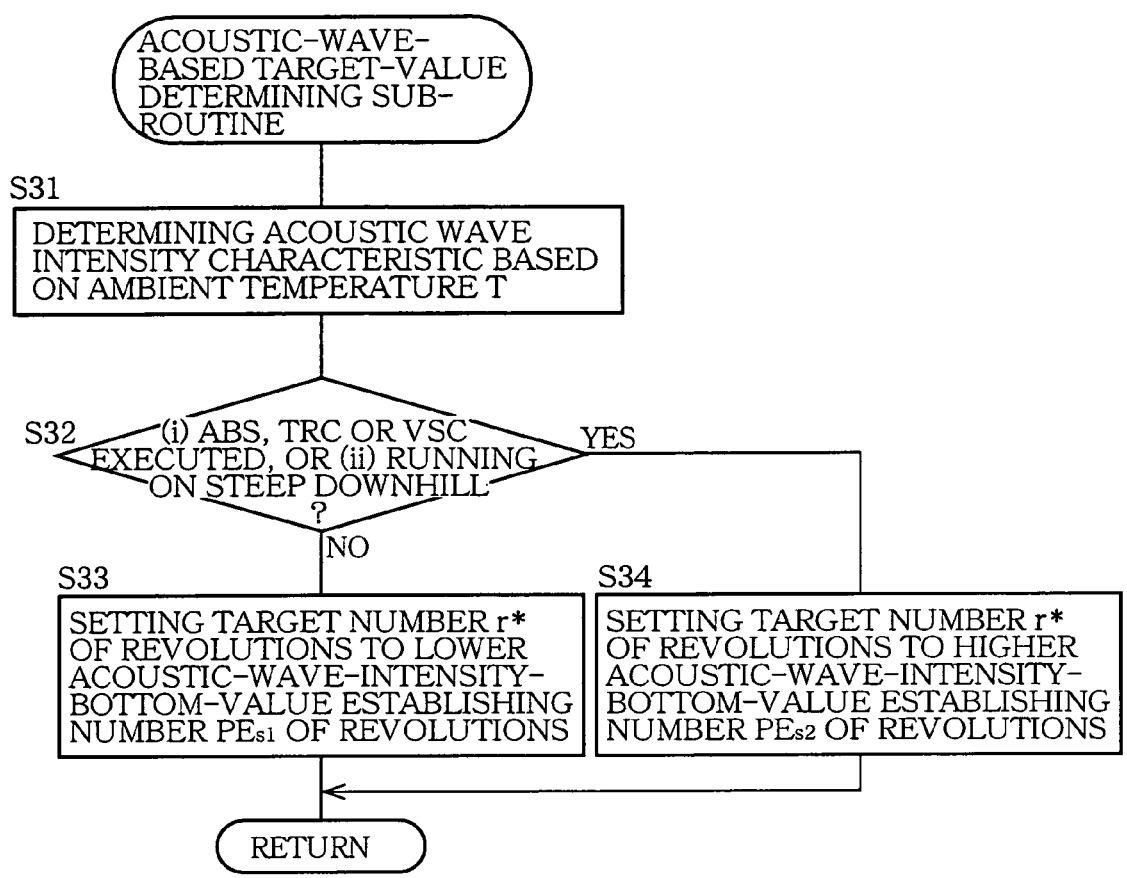
FIG. 12 is a flow chart showing an acoustic-wave-based target-value determining sub-routine which constitutes a part of the pump device controlling routine of FIG. 7.
Figure 13:
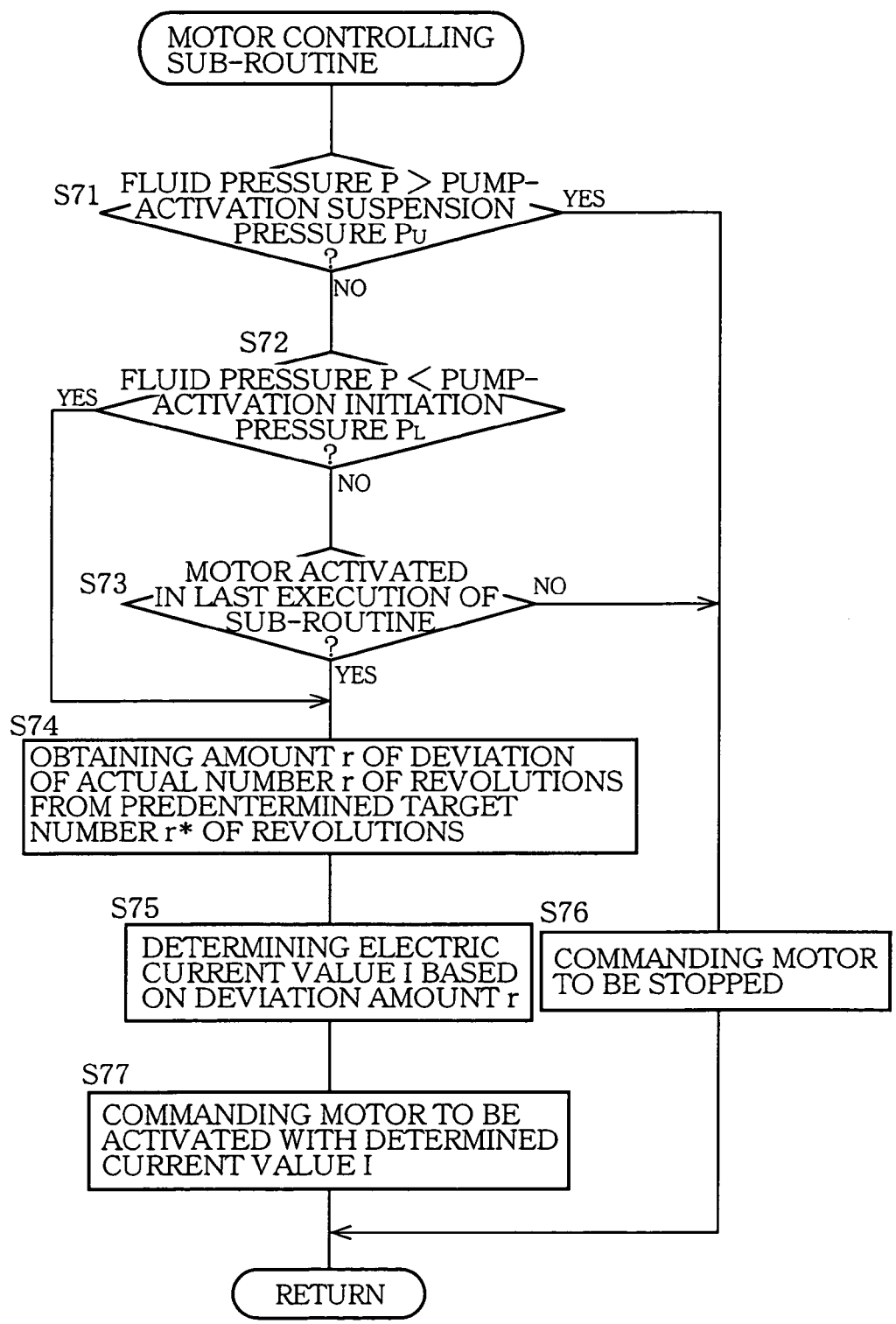
FIG. 13 is a flow chart showing a motor controlling sub-routine which constitutes a part of the pump device controlling routine of FIG. 7.
Figure 14:
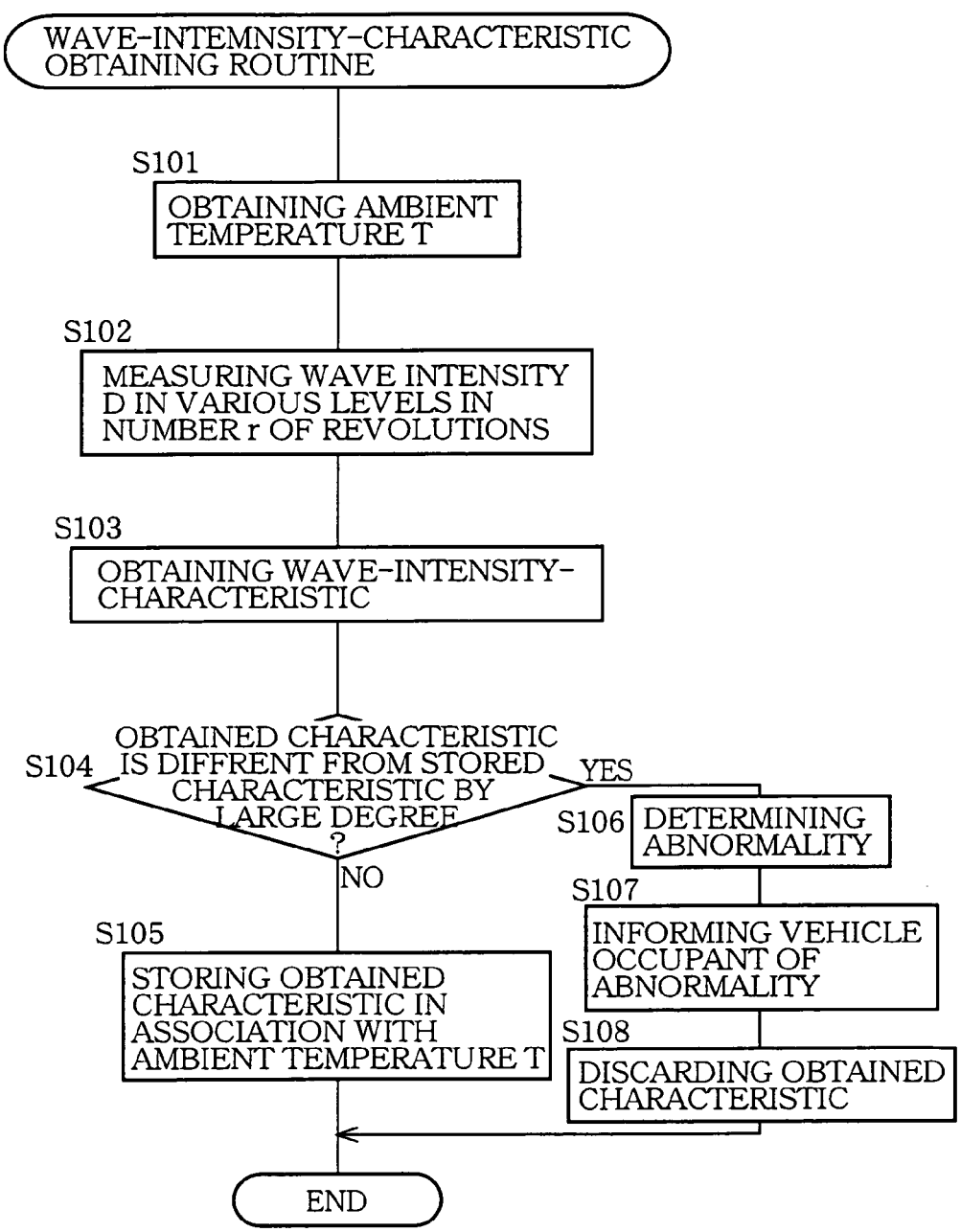
FIG. 14 is a flow chart showing a wave-intensity-characteristic obtaining routine executed in the controller of the embodiment of the invention.

In the expression (4), "g(n)" represents a weighting function which is stored in the weighting-function storing portion 186 and which is shown in a graph of FIG. 11. Meanwhile, "Kv" and "Ks" are coefficients which are predetermined such that each of the vibrational wave intensity $f_V(r)$ multiplied by the coefficient $K_v$ and the acoustic wave intensity $f_S(r)$ multiplied by the coefficient Ks can be both expressed in a common unit serving as an index indicative of how much the vehicle occupant senses the vibration or noise. That is, for example, where the vibrational wave intensity $f_V(r)$ multiplied by the coefficient $K_v$ and the acoustic wave intensity $f_S(r)$ multiplied by the coefficient Ks are substantially equivalent to each other, the vehicle occupant senses the vibration and the noise substantially in the same degree. In step S27, the target number r* of revolutions is set to a number which lies within the target-number settable range $r_{min}$–$r_{max}$ and which minimizes an evaluation value J that is calculated by the above-described evaluation function. This step S27 is implemented by the acoustic/vibrational-waves-based target-value determining portion 162 such that the target value is determined on the basis of the acoustic wave intensity characteristic and the vibrational wave intensity characteristic to each of which a relative weighting is given.

The target number r* of revolutions is determined with the execution of the acoustic/vibrational-waves-based target-value determining sub-routine of step S2, as described. On the other hand, if it is determined in step S1 that the acoustic-wave-based mode is selected, the control flow goes to step S3 in which the acoustic-wave-based target-value determining sub-routine is executed as shown in the flow chart of FIG. 12.

First, step S31 is implemented to determine, on the basis of the ambient temperature T, the acoustic wave intensity characteristic, on which are to be based in the determination of the target number r* of revolutions. That is, from among the alternative characteristics stored in the acoustic-wave-intensity-characteristic storing portion 184, the acoustic wave intensity characteristic corresponding to the current level in the ambient temperature T (which is detected by the temperature sensor 122) is read out. Like the above-described step S21, this step S31 is implemented by the wave-intensity-characteristic determining portion 168. In other words, in this step S31, the wave-intensity-characteristic determining portion 168 determines the acoustic wave intensity characteristic on the basis of the ambient temperature T as the characteristic changing factor, or selects the acoustic wave intensity characteristic from among the alternative characteristics, on the basis of the current level in the characteristic changing factor. It is noted that the description as to the controls will be continued as follows, on an assumption that the acoustic wave intensity characteristic as shown in FIG. 5 has been read out in step S31.

Step S31 is followed by step S32 which is implemented to determine at least one of two conditions is satisfied or not. The two conditions consist of a first condition is that at least one of the anti-lock brake control, traction control and vehicle stability control is currently executed by the braking system, and a second condition is that the vehicle is currently running on a downhill road whose degree of slope or inclination is higher than a predetermined threshold. The determination as to whether the second condition is satisfied or not is made on the basis of the information transmitted from the inclination sensor 124. In this instance, it is determined that the pump device 14 is required to exhibit a high performance while the anti-lock brake control, traction control and/or vehicle stability control are being executed. It is further determined that there is a high probability that the pump device 14 is required to exhibit a high performance while the vehicle is running on a downhill road having a high degree of slope, since the braking operation is effected at an increased frequency during running on such a steep downhill road. Therefore, if at least one of the above-described two condition is satisfied, namely, if an affirmative determination is obtained in step S32, the control flow goes to step S34 in which the target number r* of revolutions is set to the higher acoustic-wave-intensity-bottom-value establishing number $PE_{S2}$ of revolutions which establishes the relatively high bottom value in the acoustic wave intensity $D_s$. On the other hand, if any one of the above-described two conditions is not satisfied, namely, if a negative determination is obtained in step S32, the control flow goes to step S33 in which the target number r* of revolutions is set to the lower acoustic-wave-intensity-bottom-value establishing number $PE_{S1}$ of revolutions which establishes the relatively low bottom value in the acoustic wave intensity Ds. These steps S32-S34 are implemented by the acoustic-wave-based target-value determining portion 164, such that the target value is set to one of the plurality of acoustic-wave-intensity-bottom-value establishing numbers $PE_S$ of revolutions which is selected on the basis of the various vehicle-related factors such as the running state and operating state of the vehicle.

After the target number r* of revolutions has been determined in step S2 or step S3 as described above, step S4 is implemented to determine whether the engine is currently activated or not on the basis of information transmitted from the ignition switch 112. While the ignition switch 112 is placed in "ACC" position, the engine is not yet activated although the vehicle is initiated to be activated. In such a state, it is relatively quiet in the passengers' compartment, with a high probability that the brake pedal 10 will be operated upon start of the engine. Meanwhile, it can be determined that the fluid pressure P (at the outlet-side portion of the pump device 14) does not have to be so high, since the vehicle is not yet running. Therefore, if a negative determination (NO) is obtained in step S4, step S5 is implemented to set the above-described pump-activation initiation pressure $P_L$ to a first value $P_1$. If an affirmative determination (YES) is obtained in step S4, step S6 is implemented to set the pump-activation initiation pressure $P_L$ to a second value $P_2$ that is higher than the first value $P_1$ ($P_1 < P_2$). This arrangement reduces length of time for which the pump device 14 is activated while the engine is not activated, thereby improving the degree of silence in the vehicle. These steps S4–S6 are implemented by the activation-condition changing portion 178, such that a pump activation condition (with satisfaction of which the pump device 14 is activated) is changed in a case where a predetermined condition is satisfied Then, the control flow goes to a motor controlling sub-routine of step S7 illustrated in the flow chart of FIG. 13. Steps S71–S73 are implemented to determine, on the basis of a valued of the fluid pressure P detected by the pump pressure sensor 30, whether the motor 26 should be activated or not. That is, the motor 26 is started when the fluid pressure P (detected by the sensor 30) becomes lower than the pump-activation initiation pressure $P_L$, and is stopped when the fluid pressure P becomes higher than a pump-activation suspension pressure $P_U$ ($P_U > P_L$). Further, when the detected fluid pressure P is not lower than the pump-activation initiation pressure $P_L$ and is not higher than the pump-activation suspension pressure $P_U$, the motor 26 is held in the same operating state as in the last execution of this motor controlling sub-routine. Where the motor 26 is stopped or held in its non-activation state, the control flow goes to step S77 which is implemented to command the motor 26 to be stopped, without steps S74–S76 being implemented.

Where the motor 26 is started or held in its activation state, step S74 is implemented to obtain an amount Δr of deviation of an actual number r of revolutions (detected by the motor rotation sensor 104) from the predetermined target number r* of revolutions. Step S74 is followed by step S75 which is implemented to determine, on the basis of the deviation amount Δr, a value I of electric current that is to be applied to the motor 26. Step S76 is then implemented to command the motor 26 to be activated with application of the current having the determined value I. The motor 26 is controlled by the feedback control system such that the number r of revolutions is compensated on the basis of the deviation amount Δr in this motor controlling sub-routine of the pump-device controlling routine which is repeatedly executed at the short time interval, whereby the motor 26 can be held rotated at the predetermined target number r* of revolutions. This motor controlling sub-routine of step S7 is executed by the motor control portion 166, such that the motor 26 is controlled on the basis of the predetermined target value.

With the execution of the above-described pump-device controlling routine, the controller according to the embodiment of the invention determines the target value on the basis of at least one wave intensity characteristic, and controls the motor 26 or the pump device 14 on the basis of the determined target value. Thus, owing to the execution of the controlling routine, high degrees of silence and comfort can be enjoyed in the vehicle equipped with the hydraulically operated braking system incorporating the thus controlled pump device 14.

[Obtaining of Wave Intensity Characteristic by Controller]

The present controller is arranged to be capable of obtaining at least one wave intensity characteristic on which is to be relied in the determination of the target number r* of revolutions by the target-value determining portion 160. The wave intensity characteristic is obtained in a state in which the activation of the vehicle is initiated while the engine is not started. In such a state, a procedure for obtaining the wave intensity characteristic is effected as the characteristic obtaining switch 116 (provided in the instrument panel 102) is placed in its ON position in accordance with the vehicle driver's intention. This procedure is effected with execution of a wave-intensity-characteristic obtaining routine by the controller. The procedure will be described step by step, with reference to the flow chart of FIG. 14 which illustrates the wave-intensity-characteristic obtaining routine.

In the initiation of the procedure, step S101 is first implemented to obtain the current ambient temperature T which is detected by the temperature sensor 122. In the following step S102, the propagated acoustic wave intensity $D_S$ and the propagated vibrational wave intensity $D_V$ are measured by the sound pressure meter 130 and the vibration meter 132, respectively, while the number r of revolutions of the motor 26 is being changed within a predetermined range. That is, in this step S102, the acoustic wave intensity $D_S$ and the vibrational wave intensity $D_V$ are measured in each of various values in the number r of the revolutions of the motor 26, which values are set in a discrete manner (such that an interval between the adjacent values is 10 rpm, for example). Step S103 is then implemented to define an acoustic-wave-based relationship between the measured acoustic wave intensity $D_S$ and the number r of the revolutions, and a vibrational-wave-based relationship between the measured vibrational wave intensity $D_V$ and the number r of the revolutions. That is, in this step S103, the acoustic-wave-based relationship and the vibrational-wave-based relationship are obtained as an obtained acoustic-wave intensity characteristic and an obtained vibrational-wave intensity characteristic, respectively.

In the following step S104, the acoustic-wave intensity characteristic and the vibrational-wave intensity characteristic corresponding to the current ambient temperature T are read out of the plurality of alternative characteristics which are stored in the wave-intensity-characteristic storing portion 180, and are then compared with the obtained acoustic-wave intensity characteristic and the obtained vibrational-wave intensity characteristic, respectively. That is, in this step S104, it is determined whether at least one of the obtained acoustic-wave intensity characteristic and obtained vibrational-wave intensity characteristic is different from a corresponding one of those read out from the characteristic storing portion 180, by a degree larger than a predetermined degree. Specifically described, it is determined that the difference degree is larger than the predetermined degree, (i) where a new wave-intensity-bottom-value establishing number or numbers PE of revolutions appear in the obtained characteristic (namely, where the number wave-intensity-bottom-value establishing output value or values is increased), (ii) where the wave-intensity-bottom-value establishing number or numbers PE of revolutions present in the read-out characteristic disappear in the obtained characteristic (namely, where the number wave-intensity-bottom-value establishing output value or values is reduced), and (iii) where the wave-intensity-bottom-value establishing number or numbers PE of revolutions in the obtained characteristic is different from the corresponding number or numbers PE of revolutions in the read-out characteristic by an amount exceeding a predetermined threshold.

If it is determined in this step S104 that the difference degree is not larger than the predetermined degree in the acoustic-wave intensity characteristic and that the difference degree is not larger than the predetermined degree in the vibrational-wave intensity characteristic, namely, if a negative determination is obtained in this step S104, the control flow goes to step S105 to associate the obtained acoustic-wave intensity characteristic and obtained vibrational-wave intensity characteristic with the corresponding value of the ambient temperature T and then store them in the wave-intensity-characteristic storing portion 180, whereby the characteristics which have been stored in the storing portion 180 are replaced by those obtained characteristics. Steps S101–S105 are implemented by the wave-intensity-characteristic obtaining portion 174, such that each of at least one wave intensity characteristic corresponding to the level in the characteristic changing factor is obtained on the basis of the measured intensity of the propagated wave. Owing to the implementations of these steps S101–S105, the present controller is capable of controlling the pump device 14 on the basis of at least one wave intensity characteristic which is updated as needed. In other words, even if the wave intensity characteristic is changed due to aged deterioration in the constructions of the pump device 14 and the vehicle, the accuracy in the control to the pump device 14 can be advantageously maintained.

If it is determined in the above-described step S104 that the difference degree is larger than the predetermined degree in the acoustic-wave intensity characteristic and/or in the vibrational-wave intensity characteristic, namely, if an affirmative determination is obtained in step S104, the control flow goes to step S106 to determine that the pump device 14 or the vehicle suffers from an abnormality. In the following step S107, this determination is informed to the vehicle occupant through the warning device 134. These steps S106–S107 are implemented by the abnormality detecting portion 176, such that the abnormality of the pump device 14 or the vehicle is detected based on the obtained acoustic-wave intensity characteristic and vibrational-wave intensity characteristic. Owing to the implementations of these steps S106–S107, the vehicle occupant can be informed of even a small abnormality in an early stage, which small abnormality is not commonly notable or perceptible by the occupant. In case of the detection of the abnormality, step S108 is implemented to discard the obtained acoustic-wave intensity characteristic and vibrational-wave intensity characteristic, without these obtained characteristics being stored in the wave-intensity-characteristic storing portion 180, namely, without the corresponding characteristics stored in the storing portion 180 being updated.

In the present controller, its portion assigned to execute the wave-intensity-characteristic obtaining routine, i.e., the wave-intensity-characteristic obtaining portion 174, or this portion 174 and the abnormality detecting portion 176 may be considered to constitute a device having an independent function. In other words, it is possible to consider that the wave-intensity-characteristic obtaining portion 174, or this portion 174 and the abnormality detecting portion 176 constitute a wave-intensity-characteristic obtainer as a kind of embodiment of the invention. In this case, the wave-intensity-characteristic obtainer may be considered to include a measuring device operable to measure the intensity of the propagated wave, and a wave-intensity-characteristic obtaining device operable to obtain the wave intensity characteristic on the basis of the measured intensity, wherein the measuring device is provided by the above-described sound pressure meter 130 and vibration meter 132 while the wave-intensity-characteristic obtaining device is provided by the above-described wave-intensity-characteristic obtaining portion 174.

[Modifications to Embodiment]

In the above-described embodiment, one of the relatively high range (whose lower and upper limits are respectively defined by the vibrational-wave-intensity-bottom-value establishing number $PE_V$ of revolutions and the higher acoustic-wave-intensity-bottom-value establishing number $PE_{S2}$ of revolutions) and the relatively low range (whose lower and upper limits are respectively defined by the lower acoustic-wave-intensity-bottom-value establishing number $PE_{S1}$ of revolutions and the vibrational-wave-intensity-bottom-value establishing number $PE_V$ of revolutions) is selected as the target-number settable range $r_{min}$-$r_{max}$ as the target-value settable range. However, the target-number settable range $r_{min}$-$r_{max}$ may be defined such that its lower and upper limits are respectively defined by the two acoustic-wave-intensity-bottom-value establishing numbers $PE_{S1}$, $PE_{S2}$ of revolutions.

Figure 15A:
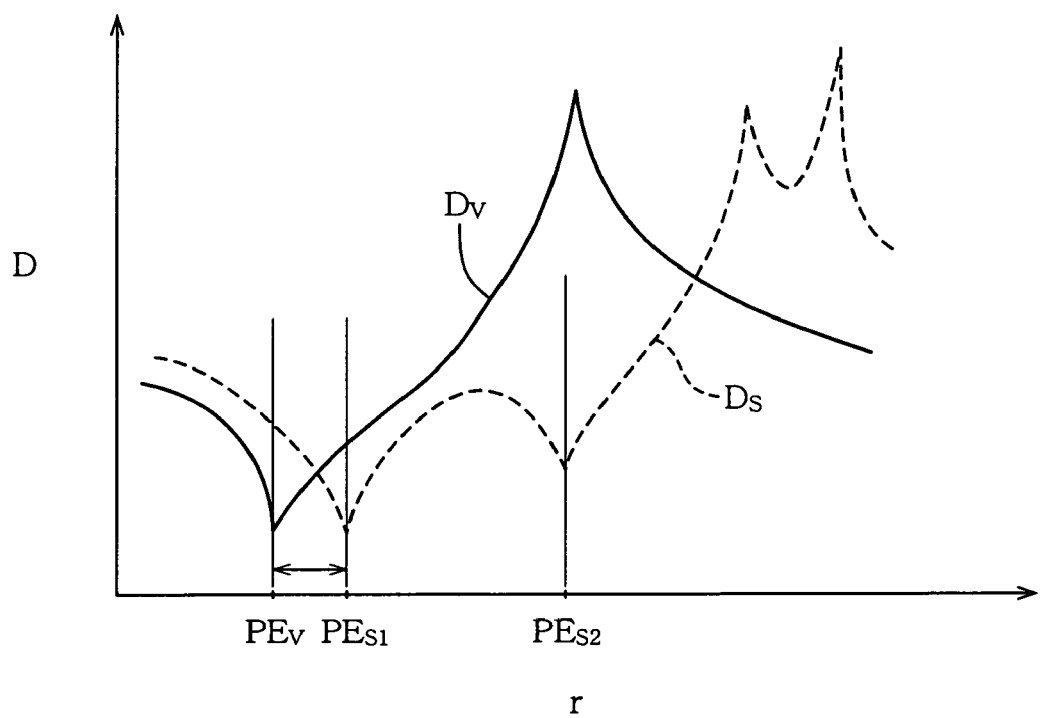
FIGS. 15A and 15B are graphs showing other examples of characteristics of intensities of acoustic and vibrational waves which are different from those of FIG. 5.
Figure 15B:
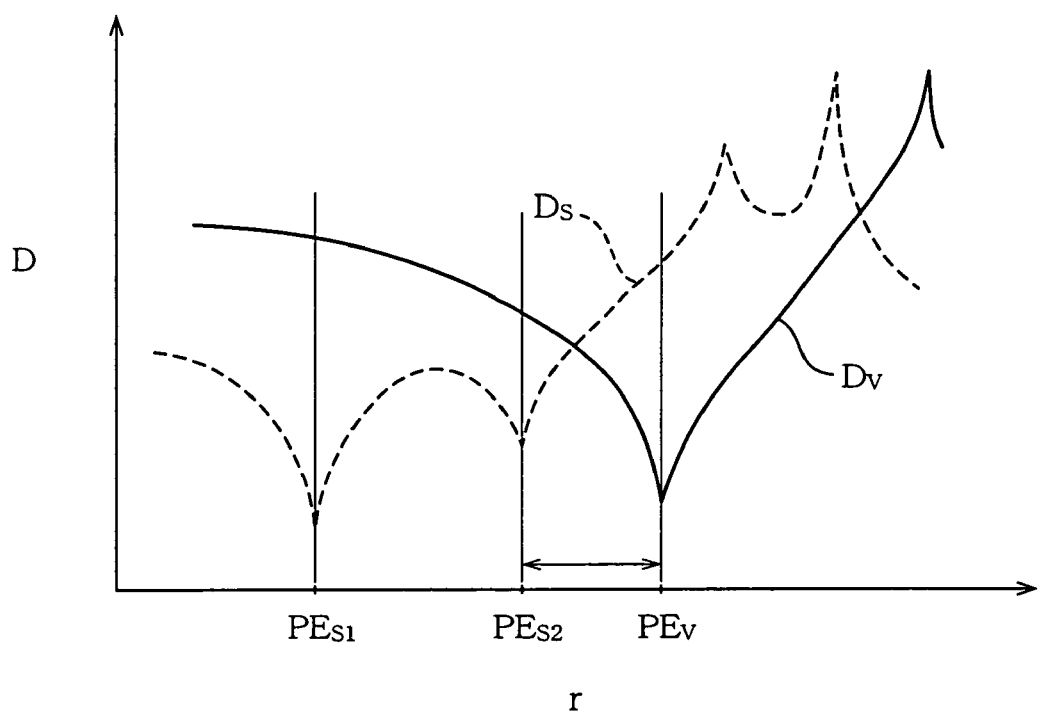

Further, the present embodiment has been described on an assumption that the vibrational-wave-intensity-bottom-value establishing number $PE_V$ of revolutions is higher than the lower acoustic-wave-intensity-bottom-value establishing number $PE_{S1}$ of revolutions and is lower than the higher acoustic-wave-intensity-bottom-value establishing number $PE_{S2}$ of revolutions. However, where the vibrational-wave-intensity-bottom-value establishing number $PE_V$ of revolutions is lower than both of the two acoustic-wave-intensity-bottom-value establishing numbers $PE_{S1}$, $PE_{S2}$ of revolutions, as shown in FIG. 15A, the target-number settable range $r_{min}$-$r_{max}$ may be defined such that its lower and upper limits are respectively defined by the vibrational-wave-intensity-bottom-value establishing number $PE_V$ of revolutions and the lower acoustic-wave-intensity-bottom-value establishing number $PE_{S1}$ of revolutions. Further, where the vibrational-wave-intensity-bottom-value establishing number $PE_V$ of revolutions is higher than both of the two acoustic-wave-intensity-bottom-value establishing numbers $PE_{S1}$, $PE_{S2}$ of revolutions, as shown in FIG. 15B, the target-number settable range $r_{min}$-$r_{max}$ may be defined such that its lower and upper limits are respectively defined by the higher acoustic-wave-intensity-bottom-value establishing number $PE_{S2}$ of revolutions and the vibrational-wave-intensity-bottom-value establishing number $PE_V$ of revolutions.

Figure 16A:
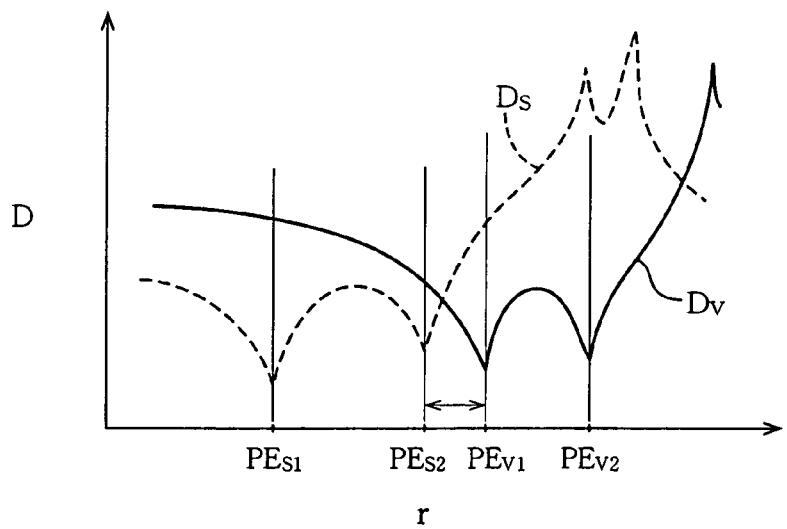
FIGS. 16A–16C are graphs showing still other examples of characteristics of intensities of acoustic and vibrational waves which are different from those of FIG. 5.
Figure 16B:
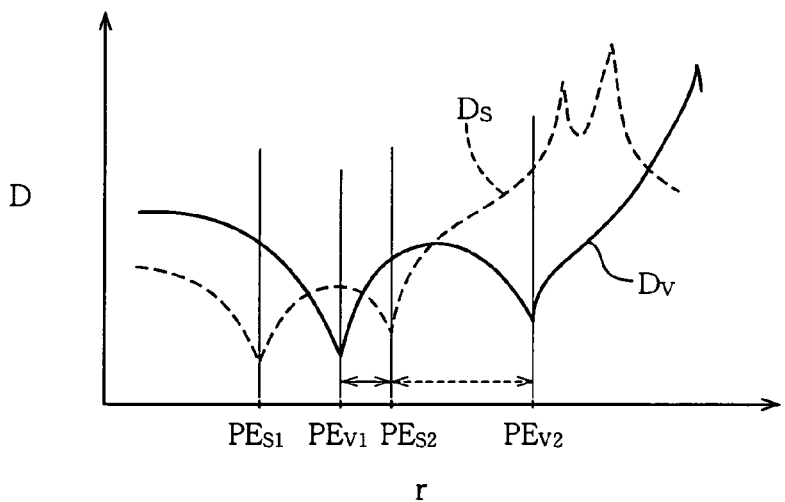
Figure 16C:
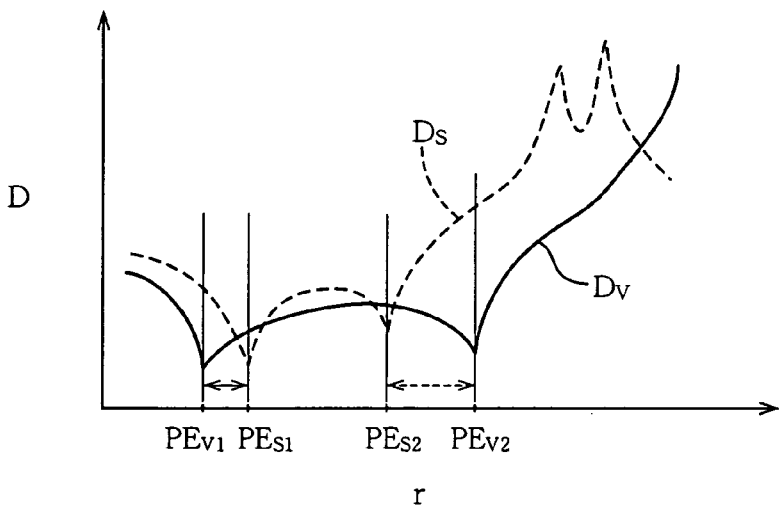

Further, where there exist two vibrational-wave-intensity-bottom-value establishing numbers $PE_{V1}$, $PE_{V2}$ of revolutions, as shown in FIGS. 16A–16C, the target-number settable range $r_{min}$-$r_{max}$ may be determined in various manners. Described specifically, in a case as shown in FIG. 16A, the target-number settable range $r_{min}$-$r_{max}$ may be defined such that its lower and upper limits are respectively defined by the higher acoustic-wave-intensity-bottom-value establishing number $PE_{S2}$ of revolutions and the lower vibrational-wave-intensity-bottom-value establishing number $PE_{V1}$ of revolutions. Further, as in each of cases as shown in FIGS. 16B and 16C, it is possible to determine two target-number settable ranges $r_{min}$-$r_{max}$, i.e., a main target-number settable ranges $r_{min}$-$r_{max}$ and an auxiliary target-number settable ranges $r_{min}$-$r_{max}$ that is to be alternatively used when the pump device is required to exhibit a high performance. Specifically described, in the case as shown in FIG. 16B, the main target-number settable range $r_{min}$-$r_{max}$ may be defined such that its lower and upper limits are respectively defined by the lower vibrational-wave-intensity-bottom-value establishing number $PE_{V1}$ of revolutions and the higher acoustic-wave-intensity-bottom-value establishing number $PE_{S2}$ of revolutions, for a reason that a difference between these two numbers $PE_{V1}$, $PE_{S2}$ of revolutions is small. Meanwhile, the auxiliary target-number settable ranges $r_{min}$-$r_{max}$ may be defined such that its lower and upper limits are respectively defined by the higher acoustic-wave-intensity-bottom-value establishing number $PE_{S2}$ of revolutions and the higher vibrational-wave-intensity-bottom-value establishing number $PE_{V2}$ of revolutions. In the case as shown in FIG. 16C, the main target-number settable range $r_{min}$-$r_{max}$ may be defined such that its lower and upper limits are respectively defined by the lower vibrational-wave-intensity-bottom-value establishing number $PE_{V1}$ of revolutions and the lower acoustic-wave-intensity-bottom-value establishing number $PE_{S1}$ of revolutions, for a reason that the peak values in the acoustic wave intensity $D_S$ and the vibrational wave intensity $D_V$ are established by relatively high numbers r of revolutions. Meanwhile, the auxiliary target-number settable ranges $r_{min}$-$r_{max}$ may be defined such that its lower and upper limits are respectively defined by the higher acoustic-wave-intensity-bottom-value establishing number $PE_{S2}$ of revolutions and the higher vibrational-wave-intensity-bottom-value establishing number $PE_{V2}$ of revolutions.

In the above-described controller according to the embodiment of the invention, the target number r* of revolutions is determined based on the various vehicle-related factors. In this instance, it is determined which one of the noise and vibration should be given more importance, on the basis of levels in the factors, in accordance with a predetermined rule. The predetermined rule is merely an example, and does not have to necessarily applied to all kinds of vehicles. That is, for example, the determination as to which one of the noise and vibration should be given more weighting in a case where one of the factors is in a high level varies from vehicle to vehicle, depending upon its construction, etc. In other words, the rules applicable to respective various vehicles could be different from each other. It is therefore preferable to define a rule suitable for each individual vehicle, so that the above-described determination for each individual vehicle can be made in accordance with the rule exclusive to the individual vehicle. Further, the set or combination of the various factors, on the basis of which the target number r* of revolutions is determined in the above-described embodiment is also merely an example, and may be modified to include some other factor. Still further, each of the above-described evaluation function and weighting function is merely an example, and may be modified so that the target number r* of revolutions is determined based on the modified evaluation function and weighting function. In addition, while the controller of the invention is provided by the controller arranged to control the pump device constituting a part of the hydraulically operated braking system in the above-described embodiment, it should be understood that the principle of the invention is equally applicable to a controller arranged to control any motor operated actuator device which is other than the pump device.

What is claimed is:

1. A controller for controlling an actuator device which is installed on a vehicle and operated by a motor, said controller comprising:
    a motor control portion operable to control the motor on the basis of a target value; and
    a target-value determining portion operable to determine said target value on the basis of at least one wave-intensity characteristic,
    wherein each of said at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor, and
    wherein said target-value determining portion sets said target value at a value corresponding to a wave-intensity-bottom-value establishing output value in said output index which establishes a bottom value in said propagated wave intensity.

2. A controller for controlling an actuator device which is installed on a vehicle and operated by a motor, said controller comprising:
    a motor control portion operable to control the motor on the basis of a target value; and
    a target-value determining portion operable to determine said target value on the basis of at least one wave intensity characteristic,
    wherein each of said at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor,
    wherein said target-value determining portion selects one of a plurality of wave-intensity-bottom-value establishing output values in said output index which establish respective bottom values in said propagated wave intensity,
    and wherein said target-value determining portion sets said target value at a value corresponding to the selected one of said plurality of wave-intensity-bottom-value establishing output values in said output index.

3. The controller according to claim 2, wherein said one of said plurality of wave-intensity-bottom-value establishing output values in said output index is selected on the basis of at least one of (i) a running state of the vehicle, (ii) an operating state of the vehicle, (iii) an activation state of each of at least one device which is installed on the vehicle and is other than the actuator device controlled by said controller, and (iv) an environment surrounding the vehicle.

4. A controller for controlling an actuator device which is installed on a vehicle and operated by a motor, said controller comprising:
    a motor control portion operable to control the motor on the basis of a target-value; and
    a target-value determining portion operable to determine said target-value on the basis of at least one wave intensity characteristic,
    wherein each of said at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor,
    wherein said at least one wave intensity characteristic includes: (a) an acoustic wave intensity characteristic which is represented by an acoustic-wave-based relationship between a propagated acoustic wave intensity as said propagated wave intensity indicative of the intensity of an acoustic wave as said wave, and said output index; and (b) a vibrational wave intensity characteristic which is represented by a vibrational-wave-based relationship between a propagated vibrational wave intensity as said propagated wave intensity indicative of the intensity of a vibrational wave as said wave, and said output index,
    wherein said target-value determining portion determines said target value on the basis of said acoustic wave intensity characteristic and said vibrational wave intensity characteristic,
    wherein said target-value determining portion selects one of (a) an acoustic-wave-intensity-bottom-value establishing output value in said output index which establishes a bottom value in said propagated acoustic wave intensity, and (b) a vibrational-wave-intensity-bottom-value establishing output value in said output index which establishes a bottom value in said propagated vibrational wave intensity,
    and wherein said target-value determining portion sets said target-value at a value corresponding to the selected one of said acoustic-wave-intensity-bottom-value establishing output value and said vibrational-wave-intensity-bottom-value establishing output value in said output index.

5. The controller according to claim 4, wherein said one of said acoustic-wave-intensity-bottom-value establishing output value and said vibrational-wave-intensity-bottom-value establishing output value in said output index is selected on the basis of at least one of (i) a running state of the vehicle, (ii) an operating state of the vehicle, (iii) an activation state of each of at least one device which is installed on the vehicle and is other than the actuator device controlled by said controller, and (iv) an environment surrounding the vehicle.

6. A controller for controlling an actuator device which is installed on a vehicle and operated by a motor, said controller comprising:
    a motor control portion operable to control the motor on the basis of a target value; and
    a target-value determining portion operable to determine said target-value on the basis of at least one wave intensity characteristic,
    wherein each of said at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor, wherein said at least one wave intensity characteristic includes: (a) an acoustic wave intensity characteristic which is represented by an acoustic-wave-based relationship between a propagated acoustic wave intensity as said propagated wave intensity indicative of the intensity of an acoustic wave as said wave, and said output index; and (b) a vibrational wave intensity characteristic which is represented by a vibrational-wave-based relationship between a propagated vibrational wave intensity as said propagated wave intensity indicative of the intensity of a vibrational wave as said wave, and said output index, and wherein said target-value determining portion determines said target-value on the basis of said acoustic wave intensity characteristic and said vibrational wave intensity characteristic to each of which a relative weighting is given.

7. The controller according to claim 6, wherein said target-value determining portion includes a relative-weighting determining portion operable to determine said relative weighting.

8. The controller according to claim 7, wherein said relative weighting is determined on the basis of at least one of (i) a running state of the vehicle, (ii) an operating state of the vehicle, (iii) an activation state of each of at least one device which is installed on the vehicle and is other than the actuator device controlled by said controller, and (iv) an environment surrounding the vehicle.

9. The controller according to claim 7, wherein said relative-weighting determining portion effects at least one of (a) a vibrational-wave-based weighting in which said relative weighting given to said vibrational wave intensity characteristic is increased when a sensitivity of the occupant of the vehicle with respect to said acoustic wave is low; and (b) an acoustic-wave-based weighting in which said relative weighting given to said acoustic wave intensity characteristic is increased when a sensitivity of the occupant of the vehicle with respect to said vibrational wave is low.

10. The controller according to claim 6, further comprising a target-value-settable-range determining portion operable to determine a target-value settable range within which said target-value is settable by said target-value determining portion.

11. The controller according to claim 10, wherein said target-value settable range is determined to be defined between two values respectively corresponding to two output values in said output index which are selected among (a) at least one acoustic-wave-intensity-bottom-value establishing output value in said output index each of which establishes a bottom value in said propagated acoustic wave intensity, and (b) at least one vibrational-wave-intensity-bottom-value establishing output value in said output index each of which establishes a bottom value in said propagated vibrational wave intensity.

12. The controller according to claim 1, further comprising a wave-intensity-characteristic determining portion operable to determine said at least one wave intensity characteristic, on the basis of which said target-value determining portion determines said target-value.

13. The controller according to claim 12, wherein said wave-intensity-characteristic determining portion determines said at least one wave intensity characteristic on the basis of a characteristic changing factor which causes said relationship between said propagated wave intensity and said output index to be changed.

14. The controller according to claim 13, wherein said wave-intensity-characteristic determining portion selects said at least one wave intensity characteristic among a plurality of alternative characteristics, on the basis of a level in said characteristic changing factor.

15. A controller for controlling an actuator device which is installed on a vehicle and operated by a motor, said controller comprising:

a motor control portion operable to control the motor on the basis of a target value;

a target-value determining portion operable to determine said target value on the basis of at least one wave intensity characteristic; and an activation-condition changing portion operable to change an activation condition, with satisfaction of which the actuator device is activated, wherein each of said at least one wave intensity characteristic is represented by a relationship between (A) a propagated wave intensity indicative of an intensity of a wave which is generated as a result of activation of the actuator device and which is propagated to occupant of the vehicle and (B) an output index indicative of an amount of an output of the motor, and wherein said activation-condition changing portion changes said activation condition such that length of time for which the actuator device is activated is reduced.

16. The controller according to claim 1, further comprising a wave-intensity-characteristic obtaining portion operable to measure said intensity of said wave, and obtain, as each of said at least one wave intensity characteristic, a wave intensity characteristic on the basis of the measured intensity of said wave.

17. The controller according to claim 16, wherein said wave-intensity-characteristic obtaining portion obtains, as each of said at least one wave intensity characteristic, said wave intensity characteristic corresponding to a level in a characteristic changing factor which causes said relationship between said propagated wave intensity and said output index to be changed.

18. The controller according to claim 16, further comprising an abnormality detecting portion operable to detect an abnormality of at least one of the vehicle and the actuator device.

19. The controller according to claim 1, controlling a pump device as the actuator device which serves as a hydraulic pressure source of a hydraulically operated braking system of the vehicle.

20. A controller for controlling an actuator device which is installed on a vehicle and operated by a motor, said controller comprising:

a motor control portion operable to control the motor on the basis of a target value;

a target value determining portion operable to determine said target value on the basis of at least one wave intensity characteristic;

a target-value settable range determining portion operable to determine a target-value settable range within which said target-value is settable by said target-value determination portion, wherein each said at least one wave intensity characteristic is represented by a relationship between (A) a propagated wave intensity indicative of an intensity of a wave which is generated as a result of activation of the actuator device and which is propagated to occupant of the vehicle, and (B) an output index indicative of an amount of an output of the motor, wherein said at least one wave intensity characteristic includes: (a) an acoustic wave intensity characteristic which is represented by an acoustic-wave-based relationship between a propagated acoustic wave intensity as said propagated wave intensity indicative of the intensity of an acoustic wave as said wave, and said output index; and (b) a vibrational wave intensity characteristic which is represented by a vibrational-wave-based relationship between a propagated vibrational wave intensity as said propagated wave intensity indicative of the intensity of a vibrational wave as said wave, and said output index, and wherein said target-value settable range is determined to be defined between two values respectively corresponding to two output values in said output index which are selected among (a) at least one acoustic-wave-intensity-bottom-value establishing output value in said output index each of which establishes a bottom value in said propagated acoustic wave intensity, and (b) at least one vibrational-wave-intensity-bottom-value establishing output value in said output index each of which establishes a bottom value in said propagated vibrational wave intensity.

* * * * *